United States Patent
Mohammed Mikaeil Salih et al.

(10) Patent No.: US 12,477,307 B2
(45) Date of Patent: Nov. 18, 2025

(54) APPARATUS AND METHOD FOR MULTICAST/BROADCAST SERVICE

(71) Applicant: JRD COMMUNICATION (SHENZHEN) LTD., Guangdong (CN)

(72) Inventors: Ahmed Mohammed Mikaeil Salih, Guangdong (CN); Jia Sheng, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 388 days.

(21) Appl. No.: 18/005,964

(22) PCT Filed: Aug. 7, 2020

(86) PCT No.: PCT/CN2020/107650
§ 371 (c)(1),
(2) Date: Jan. 18, 2023

(87) PCT Pub. No.: WO2022/027537
PCT Pub. Date: Feb. 10, 2022

(65) Prior Publication Data
US 2023/0353986 A1 Nov. 2, 2023

(51) Int. Cl.
*H04W 4/06* (2009.01)
*H04W 72/21* (2023.01)
*H04W 72/30* (2023.01)

(52) U.S. Cl.
CPC ............ *H04W 4/06* (2013.01); *H04W 72/21* (2023.01); *H04W 72/30* (2023.01)

(58) Field of Classification Search
None
See application file for complete search history.

(56) References Cited

U.S. PATENT DOCUMENTS

2016/0374050 A1* 12/2016 Prasad ............... H04W 36/0007
2019/0166580 A1    5/2019 Prasad et al.
(Continued)

FOREIGN PATENT DOCUMENTS

CN    101170724 A    4/2008
CN    101198082 A    6/2008
(Continued)

OTHER PUBLICATIONS

European Search Report in European application No. 20948352. 8,mailed on Mar. 15, 2024.
(Continued)

*Primary Examiner* — Hassan A Phillips
*Assistant Examiner* — Gautam Sharma
(74) *Attorney, Agent, or Firm* — PV IP PC; Wei Te Chung

(57) ABSTRACT

An apparatus and a method for optimal delivery of a multicast/broadcast service (MBS) are provided. A method of an MBS user equipment (UE) includes determining a first indication message to be transmitted to a network, wherein the first indication message includes a UE status associated with an MBS and/or a need for switching an MBS delivery mode. The method further includes receiving a second indication message carrying an optimal delivery mode configuration such as the scheduling information of the switched MBS delivery mode, the frequency, and/or identity of the neighboring cells or the areas that broadcast the same service that the UE is receiving before switching the delivery mode. This can solve issues in the prior art, provide a dynamic, reliable, and/or efficient MBS delivery mode switching, support service continuity, provide a good communication performance, and/or provide high reliability.

14 Claims, 6 Drawing Sheets

(56) References Cited

U.S. PATENT DOCUMENTS

| | | | | |
|---|---|---|---|---|
| 2020/0323024 A1* | 10/2020 | Huang | .................. | H04L 12/185 |
| 2022/0038866 A1* | 2/2022 | Kadiri | ................... | H04L 1/1816 |
| 2022/0329982 A1* | 10/2022 | Kim | ...................... | H04L 1/1861 |
| 2022/0338291 A1* | 10/2022 | Hong | .................... | H04W 72/30 |
| 2022/0353642 A1* | 11/2022 | Wang | ................... | H04W 76/40 |
| 2023/0023919 A1* | 1/2023 | Qi | ........................ | H04W 72/30 |
| 2023/0050170 A1* | 2/2023 | Wang | ................... | H04L 1/1854 |
| 2023/0085168 A1* | 3/2023 | Chen | ................ | H04W 28/0263 |
| | | | | 370/235 |
| 2023/0164656 A1* | 5/2023 | Paladugu | .......... | H04W 36/0016 |
| | | | | 370/331 |
| 2023/0232189 A1* | 7/2023 | Kim | ....................... | H04W 4/06 |
| | | | | 370/312 |

FOREIGN PATENT DOCUMENTS

| | | |
|---|---|---|
| CN | 109982266 A | 7/2019 |
| EP | 4021127 A1 | 6/2022 |
| WO | 2019129212 A1 | 7/2019 |
| WO | 2019223005 A1 | 11/2019 |

OTHER PUBLICATIONS

David Vargas et al:"RAN Logical Architecture and Interface for 5G-Xcast", Feb. 28, 2019(Feb. 28, 2019), pp. 1-95, XP055646813.
International Search Report in International application No. PCT/CN2020/107650, mailed on Apr. 29, 2021.
Written Opinion of the International Search Authority in International application No. PCT/CN2020/107650,mailed on Apr. 29, 2021.
ZTE et al."Discussion on the scope of NR MBS" 3GPP TSG RAN Meeting #88e RP-200818, Jul. 3, 2020 (Jul. 3, 2020), the whole document.
Huawei et al. "WID revision: NR Multicast and Broadcast Services" 3GPP TSG RAN Meeting #88-e RP-201308, Jul. 3, 2020(Jul. 3, 2020), the whole document.
Chinese Office Action issued in corresponding Chinese Patent Application No. 202080104440.5 dated Aug. 21, 2024, pp. 1-6.
KT Corp.,R2-2007134 "Discussion on delivery mode switch with service continuity in NR multicast" 3GPP tsg_ran\wg2_rl2,tsgr2_111-e, Aug. 6, 2020(Aug. 6, 2020).
Ericsson,S2-2003700 "KI#7: Update to KI#7 to clarify the switching between unicast and multicast." 3GPP tsg_sa\wg2_arch, tsgs2_139e_electronic, May 23, 2020(May 23, 2020).
Huawei,R2-070735, 3GPP tsg_ran\WG2_RL2,TSGR2_57, Feb. 9, 2007(Feb. 9, 2007).
David Vargas,5G-Xcast: RAN Logical Architecture and Interfaces for 5G-Xcast, https://www.researchgate.net/publication/332028111, Feb. 28, 2019(Feb. 28, 2019).
Chinese Office Action issued in corresponding Chinese Patent Application No. 202080104440.5 dated Mar. 29, 2025, pp. 1-7.
NPL1: CATT,S2-2004180 "KI#7, New Sol: MBS assistance information to RAN for delivery mode switching." [May 23, 2020].
NPL2: Ericsson. Nokia.Qualcomm, S2-2003682 "KI#7 Always RAN based switching within NR coverage."[May 23, 2020].

\* cited by examiner

APPARATUS AND METHOD FOR MULTICAST/BROADCAST SERVICE

CROSS REFERENCE TO RELATED APPLICATIONS

This application is a US national phase application based upon an International Application No. PCT/CN2020/107650, filed on Aug. 7, 2020, and entitled "APPARATUS AND METHOD FOR MULTICAST/BROADCAST SERVICE". The entire disclosures of the above application are incorporated herein by reference.

1. Field of the Disclosure

The present disclosure relates to the field of communication systems, and more particularly, to an apparatus and a method for a multimedia multicast/broadcast service (MBS), which can provide a good communication performance and/or provide high reliability.

2. Description of the Related Art

A wireless communication network may include a base station that can support communication for user equipments (UEs). A UE may communicate with the base station via downlink and uplink. The downlink refers to a communication link from the base station to the UE, and the uplink refers to a communication link from the UE to the base station.

In a 3rd generation partnership project (3GPP) cellular network, broadcast and multicast services may be transported via a transport service called multimedia broadcast/multicast service (MBMS). A broadcast multicast service center (BM-SC) server is responsible to disseminate a media content to a group of subscribers. When a UE moves out of a network coverage, the UE may be unable to use the MBMS because uplink and downlink connections to the BM-SC server are no longer available. MBMS is a point-to-multipoint (PTM) interface specification designed to provide efficient delivery of broadcast and multicast services within 3GPP cellular networks. Examples of MBMS interface specifications include those described in universal mobile telecommunication system (UMTS) and long term evolution (LTE) communication specifications. For broadcast transmission across multiple cells, the specifications define transmission over single-frequency network configurations. Intended applications include mobile TV, news, radio broadcasting, file delivery, emergency alerts, and others. When services are broadcasted by MBMS, all cells inside a multimedia broadcast/multicast service single frequency network (MBSFN) area transmit the same MBMS service.

Users access these services and obtain the MBMS content through wireless communication devices such as cellular phones, tablets, laptops, and other devices with wireless transceivers that communicate with the base station within the communication system. The base station provides wireless service to the wireless communication devices, sometimes referred to as mobile devices or UEs, within cells.

A user can access at least some multimedia services through a UE using either a point-to-point (PTP) connection or a PTM transmission. In 3GPP systems, PTP services can be provided using unicast techniques and PTM transmissions can be provided using MBMS communication, transmitted over an MBSFN or single cell point to multipoint (SC-PTM) communication. In systems operating in accordance with a revision of 3GPP long term evolution (LTE) communication specification, MBMS is provided using eMBMS. Accordingly, an MBMS service can be provided using either unicast service, MBSFN, or SC-PTM in an LTE system.

In LTE MBMS, a user receiving MBMS service over unicast can be switched by the network to receive the service over MBSFN, or SC-PTM. In the framework of multicast-broadcast delivery mode switching, the conventional design relies only on counting the number of users interested in same content within the whole multicast/broadcast service MBMS area to decide the trigger of the mode switching. The counting based mode-switching applies MBMS service suspension/resumption mechanism to achieve the mode switching. Such a mechanism may involve updating and modifying of the MBMS session data, which could increase the user equipment (UE) service interrupt time.

In new radio (NR), the multicast/broadcast service (MBS) is targeting per UE dynamic switching to capturing several UE requirements such as mobility, activity, and QoS requirements, which introduce the challenge of "How to perform MBS delivery mode switching in NR". Therefore, there is a need for an apparatus and a method for a multicast/broadcast service (MBS), which can solve issues in the prior art, provide a dynamic, reliable and/or efficient MBS delivery mode switching, support service continuity, provide a good communication performance, and/or provide high reliability.

SUMMARY

An object of the present disclosure is to propose an apparatus and a method for a multicast/broadcast service (MBS), which can solve issues in the prior art, provide a dynamic, reliable and/or efficient MBS delivery mode switching, support service continuity, provide a good communication performance, and/or provide high reliability.

In a first aspect of the present disclosure, a method for a multimedia/multicast/broadcast service (MBS) of a user equipment comprises determining a first indication message to be transmitted, to a network, wherein the first indication message comprises a UE status associated with an MBS and/or a need for switching an MBS delivery mode, and transmitting, to the network the first indication message.

In an embodiment of the present disclosure, the first indication message is transmitted using uplink control information (UCI), a medium access control element (MAC CE), and/or a radio resource control (RRC) message.

In an embodiment of the present disclosure, the uplink control information UCI comprises a downlink consumption report, the MAC CE comprises an indication within a logical or transport channel regarding a delivery mode, and/or the RRC message comprises an MBS interest indication or an MBS counting response.

In an embodiment of the present disclosure, the UE status associated with the MBS comprises a UE MBS downlink reception status; and/or the need for switching the MBS delivery mode comprises an explicit request for switching the MBS delivery mode.

In an embodiment of the present disclosure, the UE MBS downlink reception status comprises UE capability information regarding whether the UE supports a multicast/broadcast delivery mode, an MBS downlink consumption report, MBS Quality-of-Service (QoS) related information, MBS delivery mode information, an MBS channel related measurement, and/or an MBS subscription service change.

In an embodiment of the present disclosure, the MBS channel related measurement comprises reference signal received quality (RSRQ), reference signal received power (RSRP), and/or signal-to-noise ratio (SNR).

In an embodiment of the present disclosure, switching the MBS delivery mode comprises switching of an MBS session data from a point to multipoint (PTM) transmission over a multicast radio bearer (MRB) to a point to point (PTP) transmission over a data radio bearer (DRB).

In an embodiment of the present disclosure, switching the MBS delivery mode comprises switching from a PTP transmission over a DRB to a PTM transmission over an MRB.

In an embodiment of the present disclosure, if there is no need for switching the MBS delivery mode, the UE receives MBS session data over an existing radio bearer.

In an embodiment of the present disclosure, if there is a need for switching the MBS delivery mode, the UE receives a notification from the network during a current MBS scheduling period indicating that a radio bearer for a current MBS session data is going to be switched in an upcoming MBS scheduling period while keeps receiving MBS session data over an existing radio bearer.

In an embodiment the present disclosure, the notification may also include additional assistance information such as the frequency and/or identity of the neighboring cells or areas that broadcast the same service which the UE is receiving before the switching.

In an embodiment of the present disclosure, the notification is transmitted via a multicast control information channel.

In an embodiment of the present disclosure, the multicast control information channel comprises an MBS or multicast/broadcast control channel (MCCH) or unicast downlink control channel (DCCH).

In an embodiment of the present disclosure, if there is a need for switching the MBS delivery mode, a radio bearer is switched in up comings MBS scheduling periods.

In an embodiment of the present disclosure, the radio bearer is switched in the upcoming MBS scheduling periods by releasing an existing radio bearer, configuring new radio bearer, and configuring appropriate logical, transport and physical channel for the new radio bearer.

In an embodiment of the present disclosure, if there is a need for switching the MBS delivery mode, the UE receives MBS session data over a new radio bearer from the network.

In an embodiment of the present disclosure, the new radio bearer is configured by the network.

In an embodiment of the present disclosure, the new radio bearer is an optimal radio bearer.

In an embodiment of the present disclosure, the UE is configured with a transmission mode, multicast logical and transport and physical channels, and/or a lower layer configuration for the new radio bearer by the network.

In an embodiment of the present disclosure, the transmission mode comprises a single cell PTM (SC-PTM) transmission or an MBS single frequency network (MBSFN) transmission.

In an embodiment of the present disclosure, switching the MBS delivery mode comprises an enhancement of a service data adaptation protocol (SDAP) layer, an RRC layer, a packet data convergence protocol (PDCP) layer, a radio link control (RLC), a medium access control (MAC), and/or a physical layer.

In an embodiment of the present disclosure, the enhancement of the SDAP layer and/or the RRC layer comprises modifying a current new radio (NR) RadioBearerConfig information element (IE) by introducing a new IE to be used for configuring an MBS related radio bearer.

In an embodiment of the present disclosure, the new IE comprises an MBSbearer-Config IE.

In an embodiment of the present disclosure, configuring the MBS related radio bearer comprises addition, release, modification, and/or switching of an MBS radio bearer.

In an embodiment of the present disclosure, configuring the MBS related radio bearer comprises configuring parameters for PDCP and/or configuring SDAP entities for an MBS radio bearer.

In an embodiment of the present disclosure, the enhancement of the SDAP layer and/or the RRC layer comprises introducing MBS or multicast related bearer signalling and configuration in RRC radio bearer configuration IE.

In an embodiment of the present disclosure, the enhancement of the SDAP layer and/or the RRC layer comprises introducing mapping of MBS QoS flows of an MBS session data and/or an internet protocol (IP) multicast session data or multicast session data to specific DRB/MRB bearers to allow the network to select an optimal delivery mode for each MBS QoS flow.

In an embodiment of the present disclosure, the enhancement of the PDCP layer and/or the RLC comprises enabling a support of at least PDCP data recovery, PDCP re-establishment, or loss-less switching between DRB and MRB modes, and enabling PDCP ciphering of MRB/DRB bearer configured for an MBS or multicast session data.

In an embodiment of the present disclosure, the enhancement of the PDCP layer and/or the RLC comprises allowing MRB/DRB bearer configured for multicast session data to use an RLC acknowledged mode (AM) or an RLC unacknowledged mode (UM), and allowing logical multicast traffic and control channels configured for MRB/DRB bearer carrying multicast session data to use the RLC UM or the RLC AM.

In an embodiment of the present disclosure, the enhancement of MAC and/or the physical layer comprises introducing the first indication message from the UE to the network.

In an embodiment of the present disclosure, the enhancement of MAC and/or the physical layer comprises introducing a second indication message from the network to the UE to carry multicast assistance information.

In an embodiment of the present disclosure, the multicast assistance information comprises scheduling information of a switched bearer, frequency, and/or identity (ID) of neighboring cells or MBS areas that broadcast the same service that the UE is receiving before the switching.

In an embodiment of the present disclosure, the enhancement of MAC and/or the physical layer comprises allowing a dynamic allocation of a frequency domain resource and/or a time domain resource of a transport downlink multicast channel and a physical downlink multicast channel to MRB/DRB bearer.

In a second aspect of the present disclosure, a user equipment for an MBS comprises a memory, a transceiver, and a processor coupled to the memory and the transceiver. The processor is configured to determine a first indication message to be transmitted, to a network, wherein the first indication message comprises a UE status associated with an MBS and/or a need for switching an MBS delivery mode, and the processor is configured to transmit, to the network, the first indication message.

In an embodiment of the present disclosure, the first indication message is transmitted using uplink control information (UCI), a medium access control element (MAC CE), and/or a radio resource control (RRC) message.

In an embodiment of the present disclosure, the UCI comprises a downlink consumption report, the MAC CE comprises an indication within a logical or transport channel regarding a delivery mode, and/or the RRC message comprises an MBS interest indication or an MBS counting response.

In an embodiment of the present disclosure, the UE status associated with the MBS comprises a UE MBS downlink reception status; and/or the need for switching the MBS delivery mode comprises an explicit request for switching the MBS delivery mode.

In an embodiment of the present disclosure, the UE MBS downlink reception status comprises UE capability information regarding whether the UE supports a multicast/broadcast delivery mode, an MBS downlink consumption report, MBS Quality-of-Service (QoS) related information, MBS delivery mode information, an MBS channel related measurement, and/or an MBS subscription service change.

In an embodiment of the present disclosure, the MBS channel related measurement comprises reference signal received quality (RSRQ), reference signal received power (RSRP), and/or signal-to-noise ratio (SNR).

In an embodiment of the present disclosure, switching the MBS delivery mode comprises switching from a point to multipoint (PTM) transmission over a multicast radio bearer (MRB) to a point to point (PTP) transmission over a data radio bearer (DRB).

In an embodiment of the present disclosure, switching the MBS delivery mode comprises switching from a PTP transmission over a DRB to a PTM transmission over an MRB.

In an embodiment of the present disclosure, if there is no need for switching the MBS delivery mode, the UE receives MBS session data over an existing radio bearer.

In an embodiment of the present disclosure, if there is a need for switching the MBS delivery mode, the UE receives a notification from the network during a current MBS scheduling period that indicating a radio bearer for a current MBS session data is going to be switched in an upcoming MBS scheduling period while keeps receiving MBS session data over an existing radio bearer.

In an embodiment the present disclosure, the notification may also include additional assistance information such as the frequency and/or identity of the neighboring cells or areas that broadcast the same service which UE is receiving before the switching.

In an embodiment of the present disclosure, the notification is transmitted via a multicast control information channel.

In an embodiment of the present disclosure, the multicast control information channel comprises an MBS control channel (MCCH) or unicast downlink control channel (DCCH).

In an embodiment of the present disclosure, if there is a need for switching the MBS delivery mode, a radio bearer is switched in up comings MBS scheduling periods.

In an embodiment of the present disclosure, the radio bearer is switched in the upcoming MBS scheduling period by releasing an existing radio bearer.

In an embodiment of the present disclosure, if there is a need for switching the MBS delivery mode, the UE receives MBS session data over a new radio bearer from the network.

In an embodiment of the present disclosure, the new radio bearer is configured by the network.

In an embodiment of the present disclosure, the new radio bearer is an optimal radio bearer.

In an embodiment of the present disclosure, the UE is configured with a transmission mode, multicast logical and transport and physical channels, and/or a lower layer configuration for the new radio bearer by the network.

In an embodiment of the present disclosure, the transmission mode comprises a single cell PTM (SC-PTM) transmission or an MBS single frequency network (MBSFN) transmission.

In an embodiment of the present disclosure, switching the MBS delivery mode comprises an enhancement of a service data adaptation protocol (SDAP) layer, an RRC layer, a packet data convergence protocol (PDCP) layer, a radio link control (RLC), a medium access control (MAC), and/or a physical layer.

In an embodiment of the present disclosure, the enhancement of the SDAP layer and/or the RRC layer comprises modifying a current new radio (NR) RadioBearerConfig information element (IE) by introducing a new IE to be used for configuring an MBS related radio bearer.

In an embodiment of the present disclosure, the new IE comprises an MBSbearer-Config IE.

In an embodiment of the present disclosure, configuring the MBS related radio bearer comprises addition, release, modification, and/or switching of an MBS radio bearer.

In an embodiment of the present disclosure, configuring the MBS related radio bearer comprises configuring parameters for PDCP and/or configuring SDAP entities for an MBS radio bearer.

In an embodiment of the present disclosure, the enhancement of the SDAP layer and/or the RRC layer comprises introducing MBS or multicast related bearer signaling and configuration in RRC radio bearer configuration IE.

In an embodiment of the present disclosure, the enhancement of the SDAP layer and/or the RRC layer comprises introducing mapping of MBS QoS flows of an MBS session data and/or an internet protocol (IP) multicast session data or multicast session data to specific DRB/MRB bearers to allow the network to select an optimal delivery mode for each MBS QoS flow.

In an embodiment of the present disclosure, the enhancement of the PDCP layer and/or the RLC comprises enabling a support of at least PDCP data recovery, PDCP re-establishment, or loss-less switching between DRB and MRB modes, and enabling PDCP ciphering of MRB/DRB bearer configured for an MBS or multicast session data.

In an embodiment of the present disclosure, the enhancement of the PDCP layer and/or the RLC comprises allowing MRB/DRB bearer configured for multicast session data to use an RLC acknowledged mode (AM) or an RLC unacknowledged mode (UM), and allowing logical multicast traffic and control channels configured for MRB/DRB bearer carrying multicast session data to use the RLC UM or the RLC AM.

In an embodiment of the present disclosure, the enhancement of MAC and/or the physical layer comprises introducing the first indication message from the UE to the network.

In an embodiment of the present disclosure, the enhancement of MAC and/or the physical layer comprises introducing a second indication message from the network to the UE to carry multicast assistance information.

In an embodiment of the present disclosure, the multicast assistance information comprises scheduling information of a switched bearer, frequency, and/or identity (ID) of neighboring cells or MBS areas that broadcast the same service that the UE is receiving before the switching.

In an embodiment of the present disclosure, the enhancement of MAC and/or the physical layer comprises allowing a dynamic allocation of a frequency domain resource and/or a time domain resource of a transport downlink multicast channel and a physical downlink multicast channel to MRB/DRB bearer.

In a third aspect of the present disclosure, a method for an MBS of a network comprises receiving a first indication message, from a user equipment (UE), wherein the first indication message comprises a UE status associated with an MBS and/or a need for switching an MBS delivery mode, and evaluating the first indication message.

In an embodiment of the present disclosure, the first indication message is transmitted using uplink control information (UCI), a medium access control element (MAC CE), and/or a radio resource control (RRC) message.

In an embodiment of the present disclosure, the UCI comprises a downlink consumption report, the MAC CE comprises an indication within a logical or transport channel regarding a delivery mode, and/or the RRC message comprises an NR based MBS interest indication or an MBS counting response.

In an embodiment of the present disclosure, the UE status associated with the MBS comprises a UE MBS downlink reception status; and/or the need for switching the MBS delivery mode comprises an explicit request for switching the MBS delivery mode.

In an embodiment of the present disclosure, the UE MBS downlink reception status comprises UE capability information regarding whether the UE supports a multicast/broadcast delivery mode, an MBS downlink consumption report, MBS Quality-of-Service (QoS) related information, MBS delivery mode information, an MBS channel related measurement, and/or an MBS subscription service change.

In an embodiment of the present disclosure, the MBS channel related measurement comprises reference signal received quality (RSRQ), reference signal received power (RSRP), and/or signal-to-noise ratio (SNR).

In an embodiment of the present disclosure, switching the MBS delivery mode comprises switching from a point to multipoint (PTM) transmission over a multicast radio bearer (MRB) to a point to point (PTP) transmission over a data radio bearer (DRB).

In an embodiment of the present disclosure, switching the MBS delivery mode comprises switching from a PTP transmission over a DRB to a PTM transmission over an MRB.

In an embodiment of the present disclosure, the method further comprises deciding if switching the MBS delivery mode is needed based on evaluating the first indication message and/or a network internal configuration and/or a core network indication.

In an embodiment of the present disclosure, the network internal configuration comprises a network capability regarding whether the network supports a multicast/broadcast delivery mode; a network performance; and/or a radio resource availability.

In an embodiment of the present disclosure, the network performance comprises a congestion status, a load, a failure, and/or a communication performance.

In an embodiment of the present disclosure, the core network indication comprises an MBS service statistic or prediction report, UE subscription information, and/or MBS QoS related information indication.

In an embodiment of the present disclosure, the core network indication is provided from a core network to a next generation radio access network (NG-RAN) node via a NG-U tunnel or a N2 interface.

In an embodiment of the present disclosure, the network decides to switch the MBS delivery mode according to that: an MBS traffic exceeds a certain threshold, a number of the UE receiving the same MBS content reaches a specific number, allocated radio resources between multicast bearers and unicast bearers exceed a certain threshold, and/or the UE moves from MBS service areas/cells, or in a case that the UE or a core network suggests an explicit delivery mode.

In an embodiment of the present disclosure, if there is no need for switching the MBS delivery mode, the network transmits MBS session data over an existing radio bearer.

In an embodiment of the present disclosure, if there is a need for switching the MBS delivery mode, the network transmits, to the UE, a notification during a current MBS scheduling period that indicating a radio bearer for a current MBS session data is going to be switched in an upcoming MBS scheduling period while keeps transmitting MBS session data over an existing radio bearer.

In an embodiment the present disclosure, the notification may also include additional assistance information such as the frequency and/or identity of the neighboring cells or areas that broadcast the same service which UE is receiving before the switching.

In an embodiment of the present disclosure, the notification is transmitted via a multicast control information channel.

In an embodiment of the present disclosure, the multicast control information channel comprises an MBS control channel (MCCH) or unicast downlink control channel (DCCH).

In an embodiment of the present disclosure, if there is a need for switching the MBS delivery mode, a radio bearer is switched in up comings MBS scheduling periods.

In an embodiment of the present disclosure, the radio bearer is switched in the upcoming MBS scheduling period by releasing an existing radio bearer.

In an embodiment of the present disclosure, if there is a need for switching the MBS delivery mode, the network transmits, to the UE, MBS session data over a new radio bearer.

In an embodiment of the present disclosure, the new radio bearer is configured by the network.

In an embodiment of the present disclosure, the new radio bearer is an optimal radio bearer.

In an embodiment of the present disclosure, the method further comprises configuring, to the UE, a transmission mode, multicast logical and transport and physical channels, and/or a lower layer configuration for the new radio bearer by the network.

In an embodiment of the present disclosure, configuring the MBS related radio bearer comprises addition, release, modification, and/or switching of an MBS radio bearer.

In an embodiment of the present disclosure, the transmission mode comprises a single cell PTM (SC-PTM) transmission or an MBS single frequency network (MBSFN) transmission.

In an embodiment of the present disclosure, switching the MBS delivery mode comprises an enhancement of a service data adaptation protocol (SDAP) layer, an RRC layer, a packet data convergence protocol (PDCP) layer, a radio link control (RLC), a medium access control (MAC), and/or a physical layer.

In an embodiment of the present disclosure, the enhancement of the SDAP layer and/or the RRC layer comprises modifying a current new radio (NR) RadioBearerConfig information element (IE) by introducing a new IE to be used for configuring an MBS related radio bearer.

In an embodiment of the present disclosure, the new IE comprises an MBSbearer-Config IE.

In an embodiment of the present disclosure, configuring the MBS related radio bearer comprises addition, release, modification, and/or switching of an MBS radio bearer.

In an embodiment of the present disclosure, configuring the MBS related radio bearer comprises configuring parameters for PDCP and/or configuring SDAP entities for an MBS radio bearer.

In an embodiment of the present disclosure, the enhancement of the SDAP layer and/or the RRC layer comprises introducing MBS or multicast related bearer signalling and configuration in RRC radio bearer configuration IE.

In an embodiment of the present disclosure, the enhancement of the SDAP layer and/or the RRC layer comprises introducing mapping of MBS QoS flows of an MBS session data and/or an internet protocol (IP) multicast session data or multicast session data to specific DRB/MRB bearers to allow the network to select an optimal delivery mode for each MBS QoS flow.

In an embodiment of the present disclosure, the enhancement of the PDCP layer and/or the RLC comprises enabling a support of at least PDCP data recovery, PDCP re-establishment, or loss-less switching between DRB and MRB modes, and enabling PDCP ciphering of MRB/DRB bearer configured for an MBS or multicast session data.

In an embodiment of the present disclosure, the enhancement of the PDCP layer and/or the RLC comprises allowing MRB/DRB bearer configured for multicast session data to use an RLC acknowledged mode (AM) or an RLC unacknowledged mode (UM), and allowing logical multicast traffic and control channels configured for MRB/DRB bearer carrying multicast session data to use the RLC UM or the RLC AM.

In an embodiment of the present disclosure, the enhancement of MAC and/or the physical layer comprises introducing the first indication message from the UE to the network.

In an embodiment of the present disclosure, the enhancement of MAC and/or the physical layer comprises introducing a second indication message from the network to the UE to carry multicast assistance information.

In an embodiment of the present disclosure, the multicast assistance information comprises scheduling information of a switched bearer, frequency, and/or identity (ID) of neighboring cells or MBS areas that broadcast the same service that the UE is receiving before the switching.

In an embodiment of the present disclosure, the enhancement of MAC and/or the physical layer comprises allowing a dynamic allocation of a frequency domain resource and/or a time domain resource of a transport downlink multicast channel and a physical downlink multicast channel to MRB/DRB bearer.

In a fourth aspect of the present disclosure, a network for an MBS comprises a memory, a transceiver, and a processor coupled to the memory and the transceiver. The transceiver is configured to receive a first indication message, from a user equipment (UE), wherein the first indication message comprises a UE status associated with an MBS and/or a need for switching an MBS delivery mode, and the processor is configured to evaluate the first indication message.

In an embodiment of the present disclosure, the first indication message is transmitted using uplink control information (UCI), a medium access control element (MAC CE), and/or a radio resource control (RRC) message.

In an embodiment of the present disclosure, the UCI comprises a downlink consumption report, the MAC CE comprises an indication within a logical or transport channel regarding a delivery mode, and/or the RRC message comprises an MBS interest indication or an MBS counting response.

In an embodiment of the present disclosure, the UE status associated with the MBS comprises a UE MBS downlink reception status; and/or the need for switching the MBS delivery mode comprises an explicit request for switching the MBS delivery mode.

In an embodiment of the present disclosure, the UE MBS downlink reception status comprises UE capability information regarding whether the UE supports a multicast/broadcast delivery mode, an MBS downlink consumption report, MBS Quality-of-Service (QoS) related information, multicast broadcast service (MBS) delivery mode information, an MBS channel related measurement, and/or an MBS subscription service change.

In an embodiment of the present disclosure, the MBS channel related measurement comprises reference signal received quality (RSRQ), reference signal received power (RSRP), and/or signal-to-noise ratio (SNR).

In an embodiment of the present disclosure, switching the MBS delivery mode comprises switching from a point to multipoint (PTM) transmission over a multicast radio bearer (MRB) to a point to point (PTP) transmission over a data radio bearer (DRB).

In an embodiment of the present disclosure, switching the MBS delivery mode comprises switching from a PTP transmission over a DRB to a PTM transmission over an MRB.

In an embodiment of the present disclosure, the processor is configured to decide if switching the MBS delivery mode is needed based on evaluating the first indication message and/or a network internal configuration and/or a core network indication.

In an embodiment of the present disclosure, the network internal configuration comprises a network capability regarding whether the network supports a multicast/broadcast delivery mode; a network performance; and/or a radio resource availability.

In an embodiment of the present disclosure, the network performance comprises a congestion status, a load, a failure, and/or a communication performance.

In an embodiment of the present disclosure, the core network indication comprises an MBS service statistic or prediction report, UE subscription information, and/or MBS QoS related information indication.

In an embodiment of the present disclosure, the core network indication is provided from a core network to a next generation radio access network (NG-RAN) via a NG-U tunnel or a N2 interface.

In an embodiment of the present disclosure, the processor is configured to decide to switch the MBS delivery mode according to that: an MBS traffic exceeds a certain threshold, a number of the UE receiving the same MBS content reaches a specific number, allocated radio resources between multicast bearers and unicast bearers exceed a certain threshold, and/or the UE moves from MBS service areas/cells, or in a case that the UE or a core network suggests an explicit delivery mode.

In an embodiment of the present disclosure, if there is no need for switching the MBS delivery mode, the transceiver transmits MBS session data over an existing radio bearer.

In an embodiment of the present disclosure, if there is a need for switching the MBS delivery mode, the transceiver transmits, to the UE, a notification during a current MBS scheduling period that indicating a radio bearer for a current MBS session data is going to be switched in an upcoming MBS scheduling period while keeps transmitting MBS session data over an existing radio bearer.

In an embodiment the present disclosure, the notification may also include additional assistance information such as the frequency and/or identity of the neighboring cells or areas whose broadcasting the same service which UE is receiving before the switching.

In an embodiment of the present disclosure, the notification is transmitted via a multicast control information channel.

In an embodiment of the present disclosure, the multicast control information channel comprises an MBS control channel (MCCH) or unicast downlink control channel (DCCH).

In an embodiment of the present disclosure, if there is a need for switching the MBS delivery mode, a radio bearer is switched in up comings MBS scheduling periods.

In an embodiment of the present disclosure, the radio bearer is switched in the upcoming MBS scheduling period by releasing an existing radio bearer.

In an embodiment of the present disclosure, if there is a need for switching the MBS delivery mode, the transceiver transmits, to the UE, MBS session data over a new radio bearer.

In an embodiment of the present disclosure, the new radio bearer is configured by the processor.

In an embodiment of the present disclosure, the new radio bearer is an optimal radio bearer.

In an embodiment of the present disclosure, the processor configures, to the UE, a transmission mode, multicast logical and transport and physical channels, and/or a lower layer configuration for the new radio bearer by the network.

In an embodiment of the present disclosure, the transmission mode comprises a single cell PTM (SC-PTM) transmission or an MBS single frequency network (MBSFN) transmission.

In an embodiment of the present disclosure, switching the MBS delivery mode comprises an enhancement of a service data adaptation protocol (SDAP) layer, an RRC layer, a packet data convergence protocol (PDCP) layer, a radio link control (RLC), a medium access control (MAC), and/or a physical layer.

In an embodiment of the present disclosure, the enhancement of the SDAP layer and/or the RRC layer comprises modifying a current new radio (NR) RadioBearerConfig information element (IE) by introducing a new IE to be used for configuring an MBS related radio bearer.

In an embodiment of the present disclosure, the new IE comprises an MBSbearer-Config IE.

In an embodiment of the present disclosure, configuring the MBS related radio bearer comprises addition, release, modification, and/or switching of an MBS radio bearer.

In an embodiment of the present disclosure, configuring the MBS related radio bearer comprises configuring parameters for PDCP and/or configuring SDAP entities for an MBS radio bearer.

In an embodiment of the present disclosure, the enhancement of the SDAP layer and/or the RRC layer comprises introducing MBS or multicast related bearer signalling and configuration in RRC radio bearer configuration IE.

In an embodiment of the present disclosure, the enhancement of the SDAP layer and/or the RRC layer comprises introducing mapping of MBS QoS flows of an MBS session data and/or an internet protocol (IP) multicast session data or multicast session data to specific DRB/MRB bearers to allow the network to select an optimal delivery mode for each MBS QoS flow.

In an embodiment of the present disclosure, the enhancement of the PDCP layer and/or the RLC comprises enabling a support of at least PDCP data recovery, PDCP re-establishment, or loss-less switching between DRB and MRB modes, and enabling PDCP ciphering of MRB/DRB bearer configured for an MBS or multicast session data.

In an embodiment of the present disclosure, the enhancement of the PDCP layer and/or the RLC comprises allowing MRB/DRB bearer configured for multicast session data to use an RLC acknowledged mode (AM) or an RLC unacknowledged mode (UM), and allowing logical multicast traffic and control channels configured for MRB/DRB bearer carrying multicast session data to use the RLC UM or the RLC AM.

In an embodiment of the present disclosure, the enhancement of MAC and/or the physical layer comprises introducing the first indication message from the UE to the network.

In an embodiment of the present disclosure, the enhancement of MAC and/or the physical layer comprises introducing a second indication message from the network to the UE to carry multicast assistance information.

In an embodiment of the present disclosure, the multicast assistance information comprises scheduling information of a switched bearer, frequency, and/or identity (ID) of neighboring cells or MBS areas that broadcast the same service that the UE is receiving before the switching.

In an embodiment of the present disclosure, the enhancement of MAC and/or the physical layer comprises allowing a dynamic allocation of a frequency domain resource and/or a time domain resource of a transport downlink multicast channel and a physical downlink multicast channel to MRB/DRB bearer.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Figure 1:
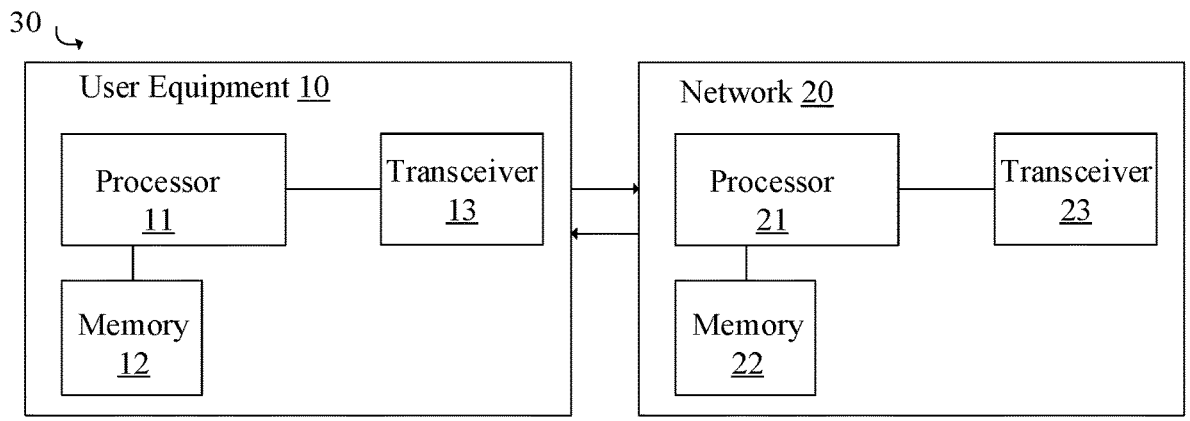
FIG. 1 is a block diagram of one or more user equipments (UEs) and a network of communication in a communication network system according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Some embodiments of the present disclosure are related to wireless communication, more specifically to a multimedia multicast/broadcast service (MBS) system. MBS is a point-to-multipoint (PTM) interface designed to provide efficient delivery of broadcast and multicast services in 3GPP cellular networks. MBS delivers multicast services within a single cell using single cell point to multipoint (SC-PTM) transmission and delivers broadcast services within a group of multiples cells using multimedia multicast/broadcast service single frequency network (MBSFN) transmission. SC-PTM uses the same long term evolution (LTE) downlink shared channel and subframe structure for transmission; while, MBSFN defines new channel and has a different subframe structure than a regular subframe LTE to ensure the transmission over a group of cells.

In a current radio access network (RAN) working, a new working item is approved, such as RP-201308, for targeting a RAN support of multicast and broadcast services as a revision of RP-193163. The aims of this WID is to provide a support in RAN for objective A of SA2 study item, such as SP-190726, about enabling general MBS services over 5GS to support uses cases such as public safety and mission critical, vehicle-to-everything (V2X) applications, transparent IPv4/IPv6 multicast delivery, IPTV, software delivery over wireless, group communications and IoT applications as well as supporting objective B of the SI which is related to the support of objective B uses cases linear TV, live, smart TV, and managed and over the top (OTT) content, radio services. One of the key objectives among the set of RP-201308 WID objectives is to study a support for dynamic change of multicast/broadcast service delivery between multicast (PTM) and unicast (PTP) with for a given UE with service continuity. Some embodiments of the present disclosure provides a method for dynamic switching of multicast/broadcast service delivery between multicast (PTM) and unicast (PTP) and vice versa, based on switching dynamically multicast/broadcast session data over MBS/ multicast radio bearers (MRB) to unicast data radio bearers (DRB)) and vice versa to guarantee efficient delivery of an MBS service.

3GPP Requirement:

There is a requirement form standard perspective (RAN WG2 and SA WG2) to support a dynamic change of multicast/broadcast service delivery between multicast (PTM) and unicast (PTP) as stated below:

In RAN WG2 WID RP-201308: It is stated to specify RAN basic functions for multicast/broadcast for UEs in RRC CONNECTED state including: Specifying a support for dynamic change of multicast/broadcast service delivery between multicast (PTM) and unicast (PTP) with service continuity for a given UE [RAN2, RAN3].

In SA WG2 SI SP-190726 and TR 23.757-5.7-Key Issue #7 and #8: It is stated for reliable delivery mode switching between unicast and multicast to study: The triggers for delivery mode switching in 5GS. How delivery mode switching between unicast and multicast modes is performed in the 5GS (including the UE) while supporting service continuity. Triggers for switching between unicast and broadcast delivery methods. How switching between unicast and broadcast delivery methods is performed in the 5GS while supporting service continuity.

In an upcoming 3GPP TSG-RAN WG2 working: this working includes new radio (NR) multicast, connected mode UEs, and dynamic PTM PTP switch with service continuity.

Prior Art on Mode Switching Proposals Supporting RAN Switching (WG SA2):

Ericsson, Nokia, Qualcomm (S2-2003682): Only RAN based switching within NR coverage is required and the switching of unicast and multicast is not required within core network for purpose of enhancing the coverage.

CATT (S2-2004180, S2-2004514): The NG-RAN may dynamically switch a delivery mode of access network (AN) resources for an MBS service from multicast/broadcast mode to unicast mode or vice versa.

Samsung, Convida Wireless (S2-2004507): Alternative solution 1: RAN triggered mode switch. Steps 2.1.a-2.1.c. of S2-2004507 show the set of request messages originated by NG-RAN that needs to be forwarded by a network with an indication to modify an MBS session data via individual delivery already established. The forwarded messages may include a subscription permanent identifier (SUPI), temporary mobile group identity (TMGI), MBS session data ID, etc. Since the NG-RAN triggers the switch, it may have done so e.g. due to a handover, due to consumption reports sent by the UE in step 1, etc.

Prior Art on Mode-Switching in MBS LTE Standard:

LTE uses counting procedure to decide whether it is economic to use PTP or PTM MBS transmission. The switching of the mode from PTP or PTM in LTE is achieved by services suspension and resumption function (TS 36.300-15.8.2.7) which is implemented by MBS scheduling information procedure as described in TS 36.300 clause 15.8.3.3. The aims of counting mechanism are to maximize radio resource efficiency through a deciding a threshold that determine the switching between the two MBS delivery mode. The major drawbacks the above procedure include: The counting based mode-switching mechanism aims only at maximizing the network resources efficiency; therefore, it relies only on counting the number of users within the whole MBS area interested in same content to decide and trigger the mode switching. This approach cannot fulfil the requirement of NR MBS, which targeting per UE switching technique that could captures UE activities, QoS requirement, mobility, and/or other NG-RAN or core network requirements. The MBS service suspension/resumption procedure involves updating and modifying an MBS session data from a core network, which increases a service interrupt time for a UE.

Therefore, there is a clear requirement from RAN WG2 perspective to support dynamic switching of multicast/broadcast service data between PTP and PTM delivery mode and vice versa. In addition, there is a comprehensive support for RAN-based mode-switching form system architecture SA WG2 as well. Motivated by the above fact, some embodiments of the present disclosure propose a method for dynamic switching of multicast/broadcast delivery method between PTM and PTP and vice versa, based on switching of MBS/multicast session data between MBS multicast/broadcast radio bearer (MRB) and unicast data radio bearer (DRB) to guarantee efficient delivery of MBS services. In some embodiments of the present disclosure, the method addresses both RAN WG2 and SA WG2 requirements regarding how the switching of multicast/broadcast delivery methods is performed in the 5GS while supporting service continuity.

In a framework of multicast/broadcast and unicast delivery mode switching, a conventional design relies only on counting the number of users interested in same content within the entire MBS area to decide and trigger the delivery mode-switching. This method cannot fulfil the requirement of NR MBS which targeting per UE switching to capture UE activities, QoS requirement, mobility, and/or other NG-RAN or core network requirements. Some embodiments of the present disclosure provide a method for dynamic switching of multicast-broadcast delivery mode base on switching the radio bearers for MBS session data between multicast/broadcast radio bearer (MRB) and unicast data radio bearer (DRB) and vice versa, and provide some enhancements to RAN2 NR specifications to enable its MBS session data. In some embodiments of the present disclosure, a UE sends layer1 or layer2 or layer3 messages indicating its communication status or explicitly suggesting a preferred delivery mode to a network. The network switches based on UE indication message and/or RAN internal configuration and/or core network indications about a delivery mode of MBs session data or service the delivery mode for the UE to an appropriate radio bearer to guarantee specific UE requirement such as UE mobility and QoS requirement, guarantee a service continuity and/or guarantee a specific network requirement.

Advantages of some embodiments of the present disclosure are to provide a method that addresses issues of how switching of multicast/broadcast delivery mode is performed RAN level node while supporting service continuity while complying with the approved 5G MBS mode-switching proposals provided in SA WG2. Others advantages of some embodiments of the present disclosure at UE side and network side include as follows.

UE side effect: 1. The new method provides a dynamic and seamless switching mechanism based on switching only the radio bearers for MBS/multicast session data without the need of updating the MBS session data or leaving or restarting an IP multicast session data. This could help in reducing UE service interruption time and enhanced the UE experience. 2. The method informs explicitly the UE about the time when the switching process will happen or when the new radio bearers is going to be scheduled and provides other assistance information that help UE to adjust it reception configuration beforehand to optimally receive the new configured radio bearer.

Network side effect: 1. Form network side perspective, on the top of maximizing radio resource efficiency, the method allows the switching to meet other network requirement such as meeting NG-RAN capability requirement or guaranteeing a specific communication performance or recovering from congestion and failure.

FIG. 1 illustrates that, in some embodiments, one or more user equipments (UEs) 10 and a network 20 of communication in a communication network system 30 according to an embodiment of the present disclosure are provided. The communication network system 30 includes the one or more UEs 10 and the network 20. The one or more UEs 10 may include a memory 12, a transceiver 13, and a processor 11 coupled to the memory 12 and the transceiver 13. The network 20 may include network nodes such as a next generation radio access network (NG-RAN node, an access and mobility management function (AMF) node, a session data management function (SMF) node, a network exposure function (NEF)/policy control function (PCF) node, a user plane function (UPF) node, and an application function (AF) node. The network 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to determine a first indication message to be transmitted, to the network 20, wherein the first indication message comprises a UE status associated with an MBS and/or a need for switching an MBS delivery mode, and the processor 11 is configured to transmit, to the network 20, the first indication message. This can solve issues in the prior art, provide a dynamic, reliable, and/or efficient MBS delivery mode switching, support service continuity, provide a good communication performance, and/or provide high reliability.

In some embodiments, the transceiver 23 is configured to receive a first indication message, from the user equipment (UE) 10, wherein the first indication message comprises a UE status associated with an MBS and/or a need for switching an MBS delivery mode, and the processor 21 is configured to evaluate the first indication message and switch based on UE indication message, RAN internal configuration condition and/or core network indication the delivery mode for UE and send an indication about UE about the time the new radio bearers is going to be scheduled as well as other service continuity assistance information such as scheduling information of a switched bearer, frequency, and/or cell or MBS area identity (ID) broadcasting the same service that the UE receives to before switching the radio bearer. This can help UE to adjust it reception configuration beforehand to optimally receive the new configured radio bearer, provide a dynamic, reliable, and/or efficient MBS delivery mode switching, support service continuity, provide a good communication performance, and/or provide high reliability.

Figure 2:
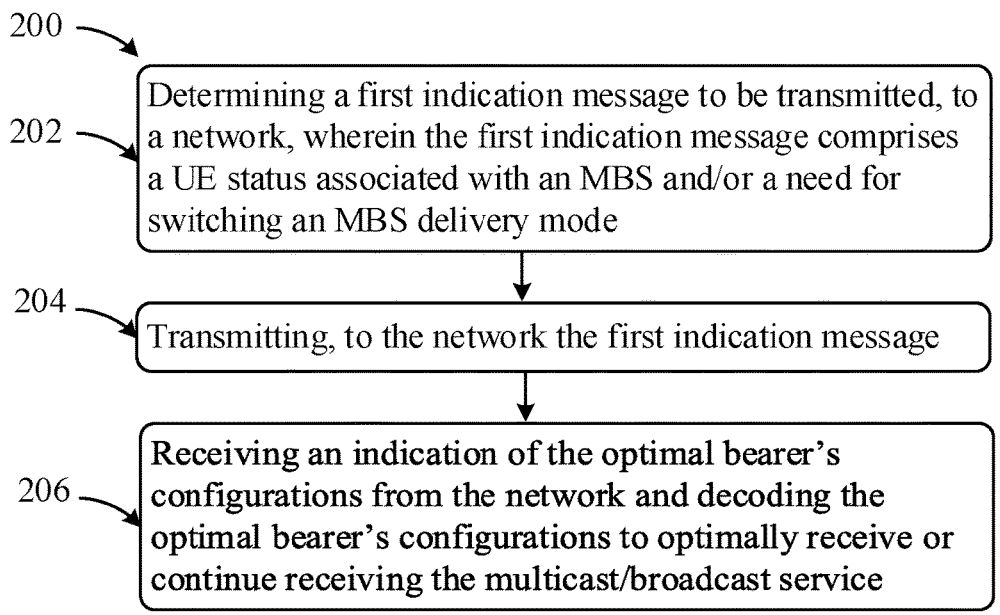
FIG. 2 is a flowchart illustrating a method for a multimedia multicast/broadcast service (MBS) of a user equipment according to an embodiment of the present disclosure.

FIG. 2 illustrates a method 200 for a multimedia multicast/broadcast service (MBS) of a user equipment in a communication network system according to an embodiment of the present disclosure. In some embodiments, the method 200 includes: a block 202, determining a first indication message to be transmitted, to a network, wherein the first indication message comprises a UE status associated with an MBS and/or a need for switching an MBS delivery mode, and a block 204, transmitting, to the network the first indication message. This can solve issues in the prior art, provide a dynamic, reliable, and/or efficient MBS delivery mode switching, support service continuity, provide a good communication performance, and/or provide high reliability. The method 200 further includes: a block 206, receiving an indication of the optimal bearer's configurations from the network and decoding the optimal bearer's configurations to optimally receive or continue receiving the multicast/broadcast service.

Figure 3:
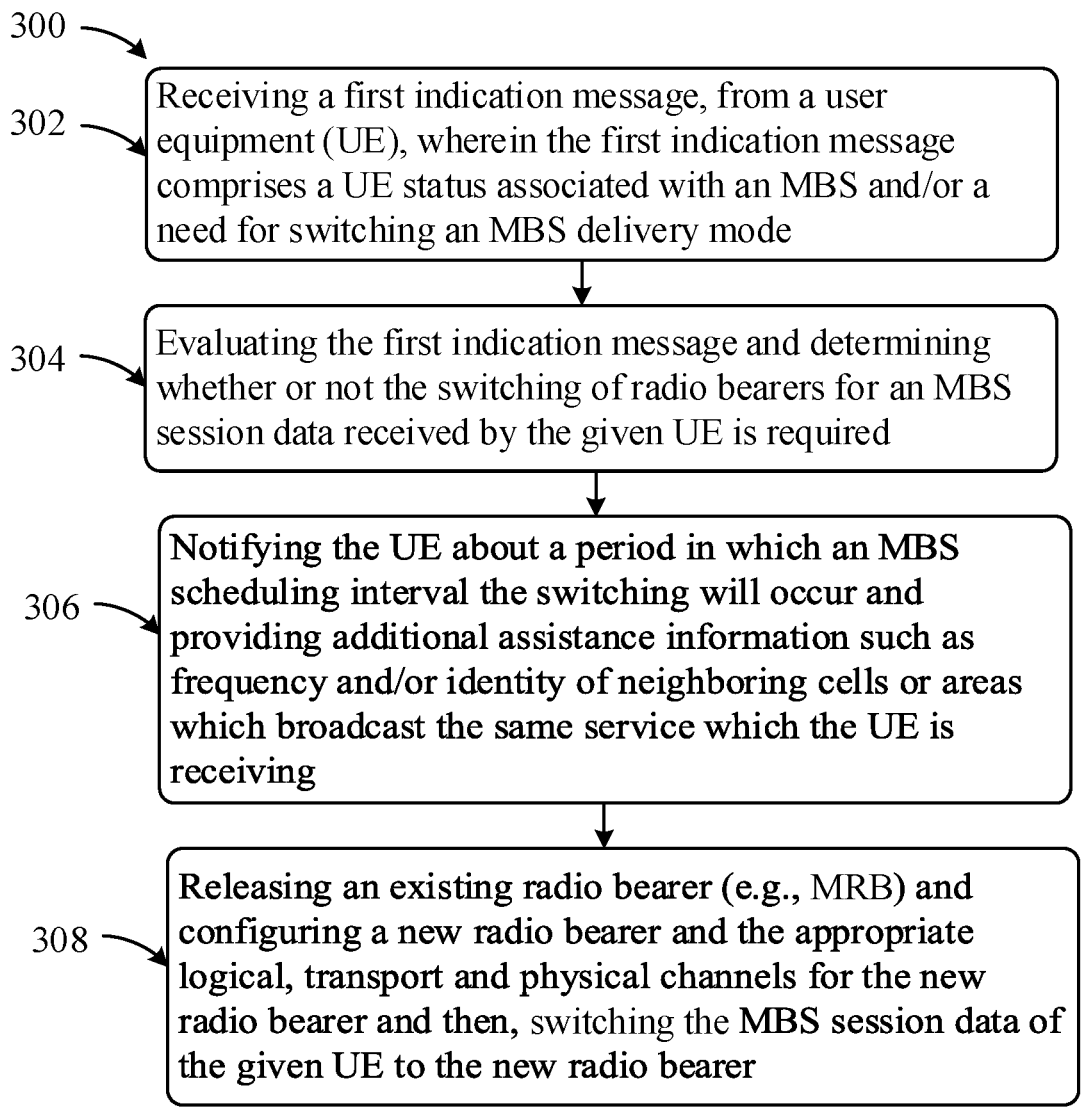
FIG. 3 is a flowchart illustrating a method for an MBS of a network according to an embodiment of the present disclosure.

FIG. 3 illustrates a method 300 for a multimedia multicast/broadcast service (MBS) of a network in a communication network system according to an embodiment of the present disclosure. In some embodiments, the method 300 includes: a block 302, receiving a first indication message, from a user equipment (UE), wherein the first indication message comprises a UE status associated with an MBS and/or a need for switching an MBS delivery mode, and a block 304, evaluating the first indication message and determining whether or not the switching of radio bearers for an MBS session data received by the given UE is required. This can solve issues in the prior art, provide a dynamic, reliable, and/or efficient MBS delivery mode switching, support service continuity, provide a good communication performance, and/or provide high reliability. The method 300 further includes: a block 306, notifying the UE about a period in which an MBS scheduling interval the switching will occur and providing additional assistance information such as frequency and/or identity of neighboring cells or areas which broadcast the same service which the UE is receiving, and a block 308, releasing an existing radio bearer (e.g., MRB) and configuring a new radio bearer and the appropriate logical, transport and physical channels for the new radio bearer and then, switching the MBS session data of the given UE to the new radio bearer.

In some embodiments, the first indication message is transmitted using uplink control information (UCI), a medium access control element (MAC CE), and/or a radio resource control (RRC) message. In some embodiments, the UCI comprises a downlink consumption report, the MAC CE comprises an indication within a logical or transport channel regarding a delivery mode, and/or the RRC message comprises an MBS interest indication or an MBS counting response. In some embodiments, the UE status associated with the MBS comprises a UE MBS downlink reception status; and/or the need for switching the MBS delivery mode comprises an explicit request for switching the MBS delivery mode. In some embodiments, the UE MBS downlink reception status comprises UE capability information regarding whether the UE supports a multicast/broadcast delivery mode, an MBS downlink consumption report, MBS Quality-of-Service (QoS) related information, MBS delivery mode information, an MBS channel related measurement, and/or an MBS subscription service change. In some embodiments, the MBS channel related measurement comprises reference signal received quality (RSRQ), reference signal received power (RSRP), and/or signal-to-noise ratio (SNR). In some embodiments, switching the MBS delivery mode comprises switching from a point to multipoint (PTM) transmission over a multicast radio bearer (MRB) to a point to point (PTP) transmission over a data radio bearer (DRB). In some embodiments, switching the MBS delivery mode comprises switching from a PTP transmission over a DRB to a PTM transmission over an MRB.

In some embodiments, the network decides if switching the MBS delivery mode is needed based on evaluating the first indication message and/or a network internal configuration and/or a core network indication. In some embodiments, the network internal configuration comprises a network capability regarding whether the network supports a multicast/broadcast delivery mode; a network performance; and/or a radio resource availability. In some embodiments, the network performance comprises a congestion status, a load, a failure, and/or a communication performance. In some embodiments, the core network indication comprises an MBS service statistic or prediction report, UE subscription information, and/or MBS QoS related information indication. In some embodiments, the core network indication is provided from a core network to a next generation radio access network (NG-RAN) via a NG-U tunnel or a N2 interface. In some embodiments, the network decides to switch the MBS delivery mode according to that: an MBS traffic exceeds a certain threshold, a number of the UE receiving the same MBS content reaches a specific number, allocated radio resources between multicast bearers and unicast bearers exceed a certain threshold, and/or the UE moves from MBS service areas/cells, or in a case that the UE or a core network suggests an explicit delivery mode.

In some embodiments, if there is no need for switching the MBS delivery mode, the network transmits MBS session data over an existing radio bearer. In some embodiments, if there is a need for switching the MBS delivery mode, the network transmits, to the UE, a notification during a current MBS scheduling period that indicating a radio bearer for a current MBS session data is going to be switched in an upcoming MBS scheduling period while keeps transmitting MBS session data over an existing radio bearer. In an embodiment the present disclosure, the notification may also include additional assistance information such as the frequency and/or identity of the neighboring cells or areas which broadcast the same service which the UE is receiving before the switching. In some embodiments, the notification is transmitted via a multicast control information channel. In some embodiments, the multicast control information channel comprises an MBS control channel (MCCH) or unicast downlink control channel (DCCH). In some embodiments, if there is a need for switching the MBS delivery mode, a radio bearer is switched in up comings MBS scheduling periods. In some embodiments, the radio bearer is switched in the upcoming MBS scheduling period by releasing an existing radio bearer. In some embodiments, if there is a need for switching the MBS delivery mode, the network transmits, to the UE, MBS session data over a new radio bearer. In some embodiments, the new radio bearer is configured by the network. In some embodiments, the new radio bearer is an optimal radio bearer.

In some embodiments, the network configures, to the UE, a transmission mode, multicast logical and transport and physical channels, and/or a lower layer configuration for the new radio bearer by the network. In some embodiments, the transmission mode comprises a single cell PTM (SC-PTM) transmission or an MBS single frequency network (MBSFN) transmission. In some embodiments, switching the MBS delivery mode comprises an enhancement of a service data adaptation protocol (SDAP) layer, an RRC layer, a packet data convergence protocol (PDCP) layer, a radio link control (RLC), a medium access control (MAC), and/or a physical layer. In some embodiments, the enhancement of the SDAP layer and/or the RRC layer comprises modifying a current new radio (NR) RadioBearerConfig information element (IE) by introducing a new IE to be used for configuring an MBS related radio bearer. In some embodiments, the new IE comprises an MBSbearer-Config IE. In some embodiments, configuring the MBS related radio bearer comprises addition, release, modification, and/or switching of an MBS radio bearer.

In some embodiments, configuring the MBS related radio bearer comprises configuring parameters for PDCP and/or configuring SDAP entities for an MBS radio bearer. In some embodiments, the enhancement of the SDAP layer and/or the RRC layer comprises introducing MBS or multicast related bearer signalling and configuration in RRC radio bearer configuration IE. In some embodiments, the enhancement of the SDAP layer and/or the RRC layer comprises introducing mapping of MBS QoS flows of an MBS session data and/or an interne protocol (IP) multicast session data or multicast session data to specific DRB/MRB bearers to allow the network to select an optimal delivery mode for each MBS QoS flow. In some embodiments, the enhancement of the PDCP layer and/or the RLC comprises enabling a support of at least PDCP data recovery, PDCP re-establishment, or loss-less switching between DRB and MRB modes, and enabling PDCP ciphering of MRB/DRB bearer configured for an MBS or multicast session data. In some embodiments, the enhancement of the PDCP layer and/or the RLC comprises allowing MRB/DRB bearer configured for multicast session data to use an RLC acknowledged mode (AM) or an RLC unacknowledged mode (UM), and allowing logical multicast traffic and control channels configured for MRB/DRB bearer carrying multicast session data to use the RLC UM or the RLC AM. In some embodiments, the enhancement of MAC and/or the physical layer comprises introducing the first indication message from the UE to the network. In some embodiments, the enhancement of MAC and/or the physical layer comprises introducing a second indication message from the network to the UE to carry multicast assistance information. In some embodiments, the multicast assistance information comprises scheduling information of a switched bearer, frequency, and/or identity (ID) of neighboring cells or MBS areas that broadcast the same service that the UE is receiving before the switching. In some embodiments, the enhancement of MAC and/or the physical layer comprises allowing a dynamic allocation of a frequency domain resource and/or a time domain resource of a transport downlink multicast channel and a physical downlink multicast channel to MRB/DRB bearer.

Figure 4:
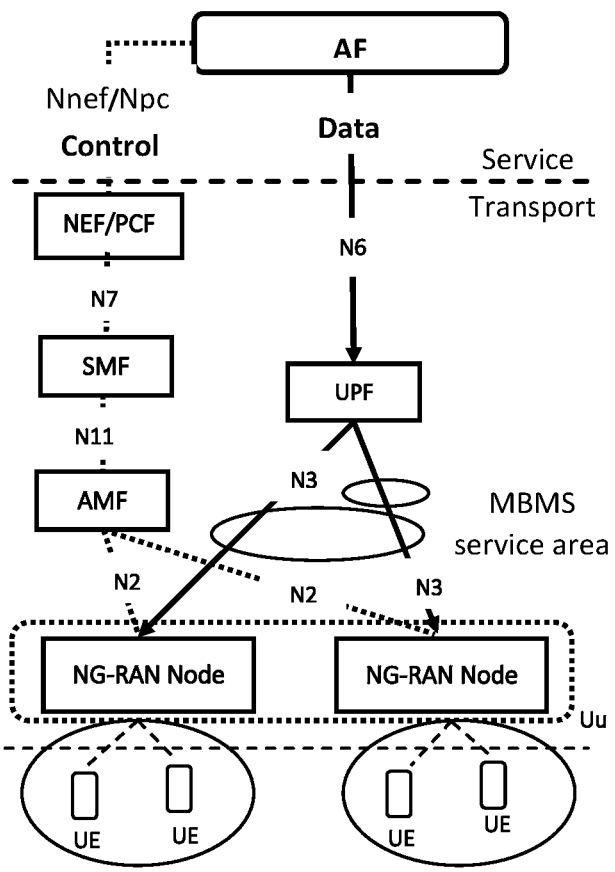
FIG. 4 is a schematic diagram illustrating a 5G new radio (NR) MBS system architecture according to an embodiment of the present disclosure.

FIG. 4 illustrates a 5G new radio (NR) MBS system architecture according to an embodiment of the present disclosure. FIG. 4 illustrates that, in some embodiments, a system architecture is provided as follows. In NR MBS, it is agreed to reuse as much as possible a current 5G NR system architecture used for unicast service to deliver MBS services with some enhancements (see TR 23.575, Annex A and B). In some embodiments of the present disclosure, enhancements include enhancing an application function (AF) by introducing a new network function called multicast service function (MSF) which provides MBS service layer functionality via Npcf or Nnef interface. In addition, enhancing a policy control function (PCF) and a network exposure function (NEF) to exchange 5G MBS QoS and service area related information with the AF, and to exchange a session data policy related information with a session data management function (SMF) over N7 interface. Further enhancement includes enhancing functions of SMF and an interface N11 that connects between SMF and AMF to support MBS control signaling as well as the management of a shared N3 tunnel between UPF and NG-RAN(s). A user plane function (UPF) is enhanced to support controls of MBS flows and the access and mobility function (AMF) is enhanced to manage over N2 interface the transmission resources for MBS across NG-RAN nodes. The NG-RAN is enhanced to support a reception of MBS flows provided by AF and UPF via N6 and N3 tunnels, respectively. The NG-RAN is also enhanced to support the switching between multicast/broadcast and unicast delivery and vice versa, and to deliver the MBS service data over-the-air interface Uu to the user equipment (UEs) within the MBS area as illustrated in FIG. 4.

Figure 5:
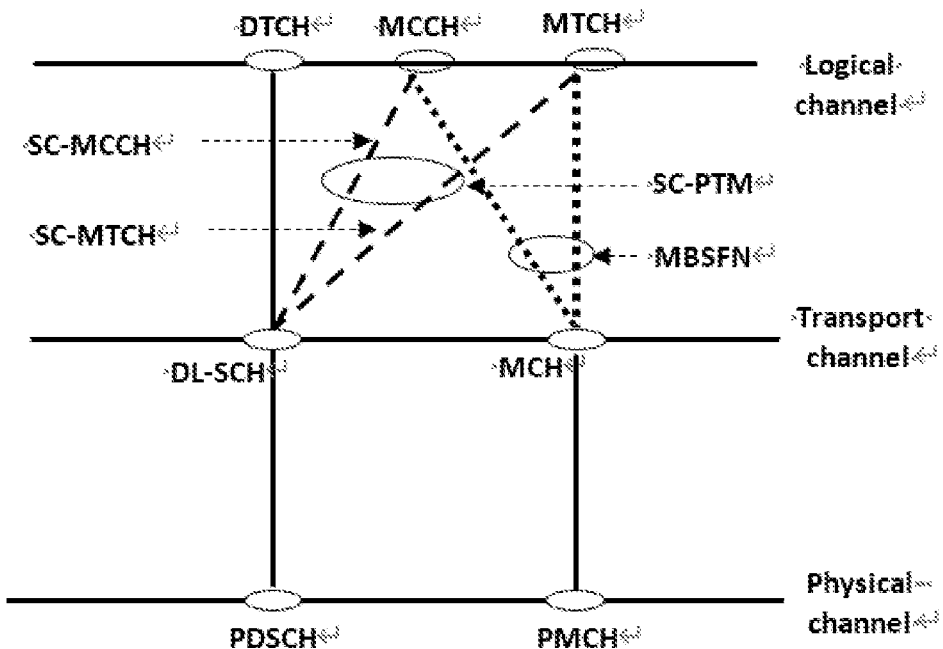
FIG. 5 is a schematic diagram illustrating 5G NR MBS channels according to an embodiment of the present disclosure.

FIG. 5 illustrates 5G NR MBS channels according to an embodiment of the present disclosure. FIG. 5 illustrates that, in some embodiments, an MBSFN service area is defined by a group of synchronized cells that are coordinated to achieve a transmission of MBS service to UEs. Assuming the same MBS channels used for LTE MBS is reused in NR MBS, for multicast MBS transmission, an SC-PTM area may use the same physical downlink shared channel (PDSCH) used by dedicated traffic channel to transmit unicast services. Within PDSCH, the MBS logical multicast traffic channels (SC-MTCHs) and multicast control channels (SC-MCCHs) are mapped from upper layer over a downlink shared channel (DL-SCH). For broadcast transmission, MBSFN area defines new plurality of physical multicast channels (PMCHs) (e.g., 15 PMCHs). Each PMCH corresponds to a multicast channel (MCH). Each MCH can multiplex a plurality (e.g., 29) of multicast logical channels. Each MBSFN area may have one MBS control channel (MCCH) or unicast downlink control channel (DCCH). As such, one MCH may multiplex one MCCH and a plurality of multicast traffic channels (MTCHs), and the remaining MCHs may multiplex a plurality of MTCHs, which carry MBS user data traffic as illustrated in FIG. 5

Figure 6:
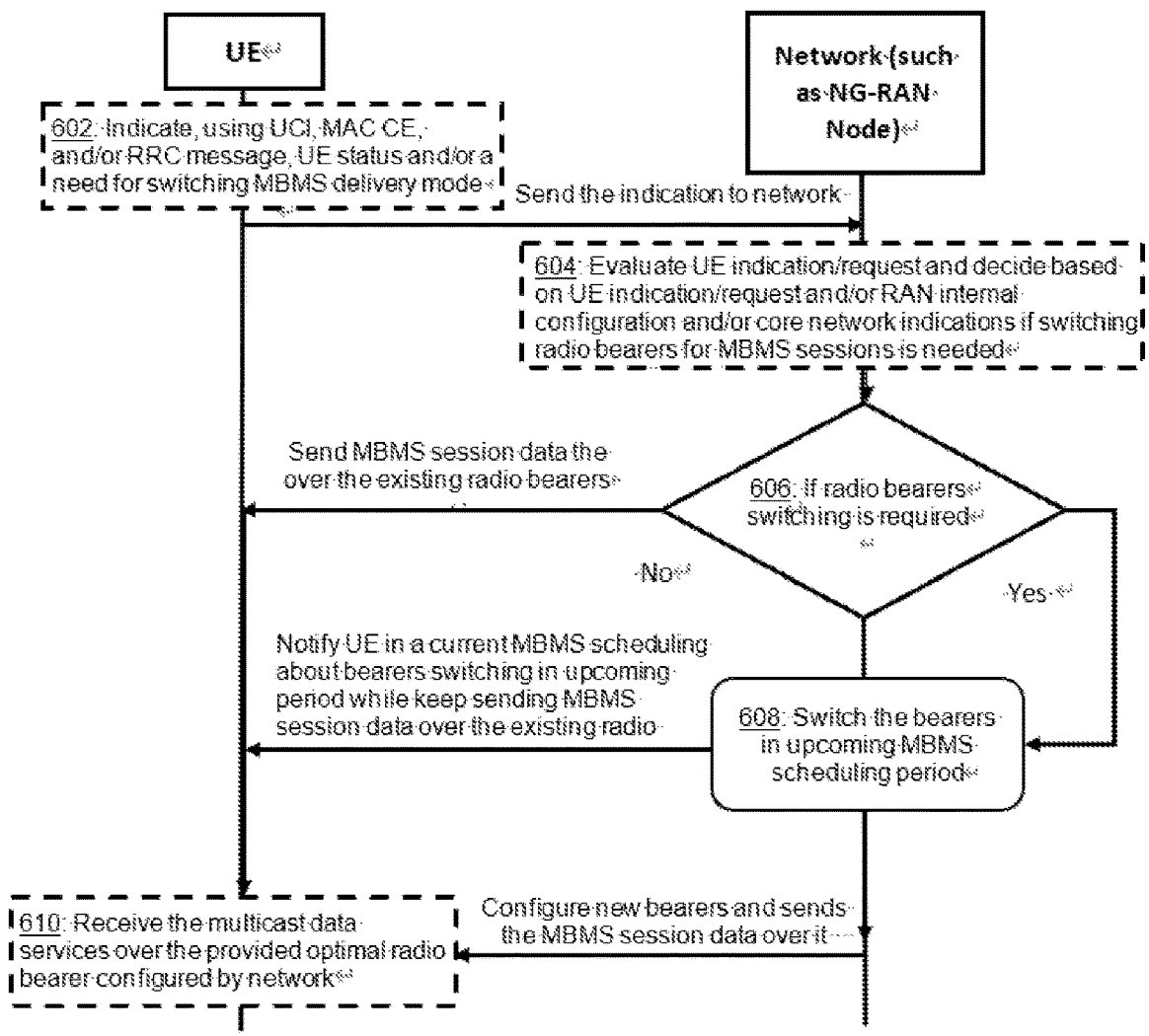
FIG. 6 is a schematic diagram illustrating a radio access network (RAN) based multicast/broadcast mode switching method according to an embodiment of the present disclosure.

FIG. 6 illustrates a radio access network (RAN) based multicast/broadcast mode switching method according to an embodiment of the present disclosure. FIG. 6 illustrates that, in some embodiments, a proposed switching method is provided. some embodiments of the present disclosure provide a method for dynamic switching of multicast/broadcast or MBS session data (IP multicast data) from PTP radio bearers to PTM radio bearers and vice versa. In this method, in a block 602, a user equipment (UE) sends an indication message via uplink control information (UCI) (e.g., downlink consumption report) and/or MAC control element (MAC CE) (e.g., an indication within logical or transport channel regarding delivery mode) and/or RRC message (e.g., MBS interest indication or MBS counting response) to a network. The indication message comprises UE MBS downlink reception status or an explicit request for switching the MBS delivery mode as illustrated in FIG. 6. The UE MBS downlink reception status may include: UE Capability information e.g. whether the UE supports multicast/broadcast delivery mode, MBS downlink consumption report, MBS QoS related information, MBS delivery mode information, MBS channel related measurement (e.g., RSRQ, RSRP and/or SNR) and/or an MBS subscription service change etc.

FIG. 6 illustrates that, in some embodiments, in a block 604 and in a block 606, the network (e.g., an NG-RAN node) evaluates UE indication message and decides based on indication or explicit request and/or RAN internal configuration and/or core network indications whether to switch the radio bearers for MBS/multicast session datas for the given UE. The RAN internal configuration may include: NG-RAN capabilities (e.g., whether the RAN supports multicast/broadcast delivery mode), NG-RAN performance (e.g. congestion status or load or failure, communication performance), and/or radio resources availability etc. The core network indications may include: MBS service statistics or prediction reports, UEs subscription information, MBS QoS related information indication (e.g. TMGI, MBS context ID, service ID, flow IDs, service area identifier (SAI), guarantee bit rate (GBR), address resolution protocol (ARP), area IDs, core network (CN) congestion reports, and indication about a failure of either unicast or MBS CN node, CN upper application suggested delivery indication etc. Such indications can be provided from CN to NG-RAN via NG-U tunnel or N2 interface.

FIG. 6 illustrates that, in some embodiments, in a block 608, the network may decide to switch radio bearers for MBS session data based on some policies include but not limited to: 1. An MBS traffic exceeds a certain threshold. 2. The number of UE receiving the same MBS content reach a specific number. 3. The allocated radio resources between multicast and unicast bearers exceed a certain threshold 4. The UE moves from MBS service areas/cells, or in the case that the UE or core network suggested an explicit delivery mode etc.

In case that the network decides that there is a need to switching the delivery mode for an MBS/multicast session data for a given UE (e.g., from PTM over MRB to PTP over DRB bearers or from PTP over DRB to PTM over MRB bearers); then, the network (the NG-RAN node) will perform at least one of the followings. 1. The network notifies UE during current MBS scheduling period/interval e.g. via multicast control information channel (such as MCCH) that the radio bearer for the current MBS/multicast session data is going to be switched (e.g., from DRB or MRB) in the upcoming MBS scheduling period/interval while keeps sending the MBS/multicast session data over the current or the existing radio bearers. (i.e. MRB). 2. The network switches in the upcoming MBS scheduling period the delivery mode of MBS session data by releasing the existing radio bearer (i.e., stops sending MSB/multicast session data over the existing bearer) and configuring a new radio bearer for MBS/multicast session data of the given UE. 3. The network configures an appropriate transmission mode (SC-PTM or MBSFN), multicast logical and transport and physical channels, and/or a lower layer configuration for the new configured radio bearer. 4. The networks sends physical (PHY) channel the configured for the new radio bearer over air interface toward UE.

FIG. 6 illustrates that, in some embodiments, in a block 610, upon the reception of the new channel configuration form the network e.g., NG-RAN node, the UE decodes channel configuration for the optimal radio bearer configuration provided by the network node and reads the configuration to continue receiving MBS service. The UE may also indicate back to RAN to stop sending multicast data over the existing bearers. In some embodiments, advantages of the method are ensuring that UE will keep receiving the MBS session data even during the switching and configuring the new radio bearers process time, which could help in providing a seamless transition between PTP and PTM delivery mode and vice versa. In addition, the radio bearer based switching method does not require updating the session data from the core network, which could help in avoiding disruption or minimizing the service interruption time at UE side. Moreover, in some embodiments, the method provides an explicit indication to UE about time or the scheduling period within which the new radio bearers is going to be scheduled prior to the switching. This could help UE to adjust it reception configuration beforehand so as to optimally receive the new configured radio bearer. It is understood that the network will send MBS multicast data or MBS session data the over the same existing radio bearers that in the case that the network decides that the switching of radio bearers no desirable for the specific UE or MBS session data.

Figure 7:
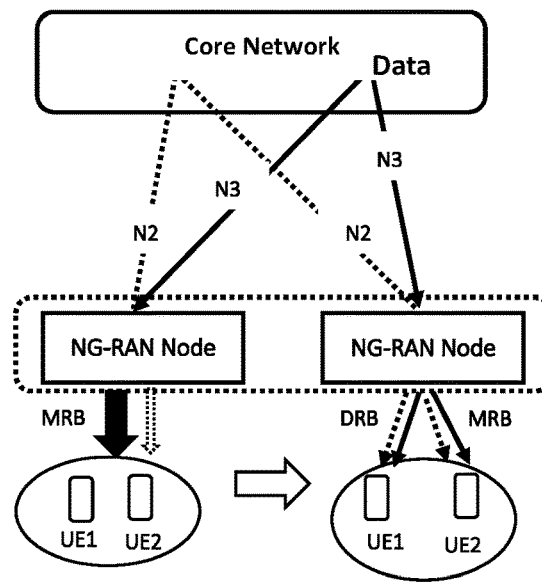
FIG. 7 is a schematic diagram illustrating a point to multipoint (PTM) to point to point (PTP) switching scenario according to an embodiment of the present disclosure.

FIG. 7 illustrates a point to multipoint (PTM) to point to point (PTP) switching scenario according to an embodiment of the present disclosure. FIG. 7 illustrates that, in some embodiments, a scenario of switching from multicast/broadcast (PTM) to unicast (PTP) due service availability requirement is assumed. In this scenario, some embodiments assume two UEs, UE1 and UE2 are receiving different MBS services over PTM or MBS/multicast radio bearer (MRB) in a given MBS cell/MBS area. At the time, when UE1 and UE2 move to another MBS cell/MBS area, UE1 may detect that the service that is receiving is not available over MRB bearer at the target cell/area while UE2 may detect that the service that is receiving still running over MRB bearer. Both UE1 and UE2 will send messages to the network (i.e., an NG-RAN node) suggesting their preferred delivery modes. The network will evaluate that the messages and accordingly will switch the radio bearer for the MBS/multicast session data received by UE1 from MRB to DRB delivery while keeping sending MBS/multicast session data received by UE1 over the same existing radio bearers (note: for case of switching from DRB to MRB the same procedure could be applied).

Figure 8:
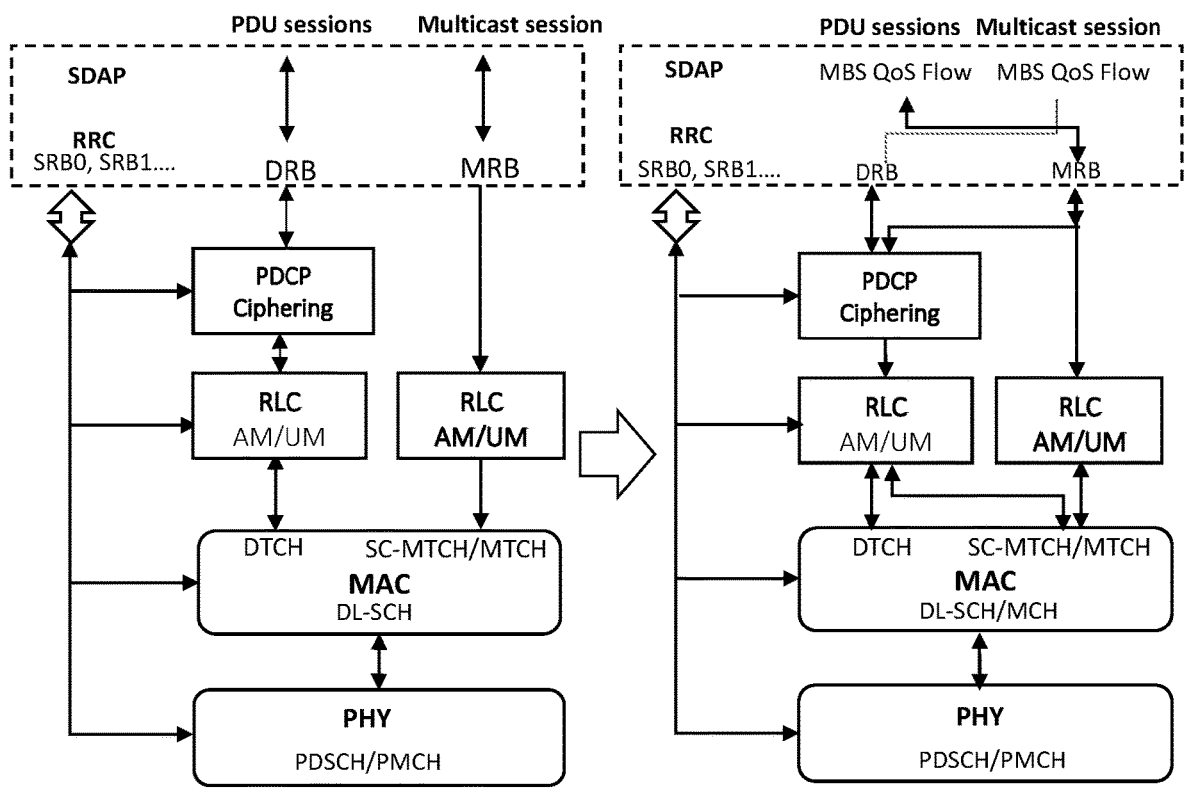
FIG. 8 is a schematic diagram illustrating mode-switching enhancements according to an embodiment of the present disclosure.

FIG. 8 illustrates mode-switching enhancements according to an embodiment of the present disclosure. FIG. 8 illustrates that, in some embodiments, several enhancements in RAN design targeting realization of the mode-switching method above-discussed are provided. The enhancements include some modifications in current NR RAN protocols and procedures in the service data adaptation protocol (SDAP) layer, the radio resource control (RRC) layer, the packet data convergence protocol (PDCP) layer and the medium access control (MAC) as well as the physical layer as illustrated in FIG. 8.

Standard Implementation of the Method:

In order to implement the MBS PTP/PTM delivery mode switching based on switching radio bearers for MBS session data as discussed by the method provided in some embodiments of the present disclosure, several enhancements are required in NR RAN protocols design and procedures. In this section, some embodiments provide several proposals of enhancements NR RAN protocols as illustrated in FIG. 8; in the service data adaptation protocol (SDAP) layer, the radio resource control (RRC) layer, packet data convergence protocol (PDCP) layer, and the medium access control (MAC) layer targeting the realization of the above-discussed delivery mode switching method.

RRC and SDAP Enhancements:

RRC Enhancements: To implement the above-proposed mode switching method, it is necessary to modify a current NR RadioBearerConfig IE by introducing a new IE such as MBSbearer-Config IE to be used for configuring MBS related radio bearer as well as the radio bearer as shown below. The configuration of MBS radio bearer may include addition and release as well as modification and switching of MBSMBS radio bearers (i.e. from MRB to DRB and vice versa). It may also include the configuration of PDCP parameters and SDAP entities for MBS radio bearers.

To implement the above-proposed MBS delivery mode switching method, some embodiments propose to modify a current NR RadioBearerConfig IE by including a new IE namely MBSbearer-Config IE to be used for configuring MBS related radio bearer (Table 1). The configuration of MBS radio bearer may include adding, modifying, switching, and releasing of MBS/multicast data radio bearers (MRB). It may also include configuring the parameters for PDCP and, if applicable, configuring SDAP entities for the MBS radio bearers. The new MBSbearer-Config IE may include the following 1) MBSbearerswitch parameters, which indicates whether the network (i.e., an NG-RAN node)shall switch the radio bearers for MBS session data of a given UE or not, and MBSbrearerSelect IE, which specifies/determines to which delivery mode (i.e., among PTP and PTM radio bearer) MBS session data of a given UE should be switched. Within MBSbrearerSelect IE, an IE such as PTP-bearerConfig IE could be used to configure DRB bearers for an MBS session data, while another IE such as PTM-bearerConfig IE could be used for configuring the MRB bearers.

The configuration of DRB bearers within PTP-bearerConfig is defined as per current NR standard (i.e., by DRB-ToAddModList, DRB-ToReleaseList, SecurityConfig IEs); whereas, for MRB bearers some embodiments propose to include new IEs such as MRB-ToAddModList, MRB-ToReleaseList and conditionally SecurityConfig IEs to be used for configuring the MRB bearers. MRB-ToAddModList configuration may include associating MRB bearer (i.e. identified by MRB-Identity) with either MBSEps-bearerIdentity such as TMGI ID (when connected to EPC) or MRB-SDAPConfig (when connected to 5GC). MRB-ToAddModList IE configuration may also include the configuration of SDAP entities for MBS radio bearers if MRB bearer is associated with SDAP is applied as well as the configuration of PDCP such as PDCP re-establishment, PDCP recovery parameters, and other PDCP configuration (Table 1).

TABLE 1

RadioBearerConfig

```
RadioBearerConfig ::=                    SEQUENCE {
    srb-ToAddModList                         SRB-ToAddModList              OPTIONAL,  -- Cond
HO-Conn
    srb3-ToRelease                           ENUMERATED{true}              OPTIONAL,  -- Need N
    drb-ToAddModList                         DRB-ToAddModList              OPTIONAL,  -- Cond
HO-toNR
    drb-ToReleaseList                        DRB-ToReleaseList             OPTIONAL,  -- Need N
    securityConfig                           SecurityConfig                OPTIONAL,  -- Need M
    mbmsbearerConfig                         CHOICE {
        mbmsbeareRelease                         NULL,
        mbmsbeareSetup                           MBMSbearer-Config         }, OPTIONAL,  -- Cond HO-
toNR
    }
MBMSbearerConfig                         SEQUENCE {
    MBMSbearerswitch                         BOOLEAN,
    MBMSbrearerSelect                        choice {
        PTP-bearerConfig SEQUENCE {
            drb-ToAddModList                     DRB-ToAddModList          OPTIONAL, -- Need N
            drb-ToReleaseList                    DRB-ToReleaseList         OPTIONAL, -- Need N
            securityConfig                       SecurityConfig            OPTIONAL, -- Cond M   }
        PTM-bearerConfig                     SEQUENCE {
            mrb-ToAddModList                     MRB-ToAddModList              OPTIONAL, -- Need N
            mrb-ToReleaseList                    MRB-ToReleaseList             OPTIONAL, -- Need N
            securityConfig                       SecurityConfig            OPTIONAL, -- Cond   }
    }
}
MRB-ToAddModList ::=                     SEQUENCE (SIZE (1..maxDRB)) OF              MRB-ToAddMod
MRB-ToAddMod ::=                         SEQUENCE {
    mrbCnAssociation                         CHOICE {
        mrbEps-bearerIdentity                    TMGI-nr
        mrbSdap-Config                           MRB-SDAPConfig
                                                                          } OPTIONAL,  -- Cond
DRBSetup
        mrb-Identity                         MRB-Identity,
        reestablishPDCP                      ENUMERATED{true}              OPTIONAL,  -- Need
N
        recoverPDCP                          ENUMERATED{true}              OPTIONAL,  -- Need
N
        pdcp-Config                          PDCP-Config                   OPTIONAL,  -- Cond
PDCP¥}
MRB-ToReleaseList ::= SEQUENCE (SIZE (1..maxMRB))  OF   MRB-Identity
MRB-Identity ::=                         INTEGER (0... maxMRB-1)
maxDRB                                   INTEGER ::= e.g, 29   -- Max# of MRBs to be added(= Session
data PerPMCH).
```

TABLE 1-continued

| RadioBearerConfig | |
|---|---|
| TMGI-nr ::=<br>    plmn-Id-nr<br>    serviceId<br>} | SEQUENCE {<br>PLMN-Identity-EUTRA-5GC,<br>OCTET STRING (SIZE (3)) |
| PLMN-Identity-EUTRA-5GC ::=<br>    plmn-Identity-EUTRA-5GC<br>    plmn-index | CHOICE {<br>PLMN-Identity,<br>INTEGER (1..maxPLMN)    } |

SDAP Enhancements: There is a requirement to capture as much as possible the objective identified by SA1 in and captured in clause 6.13.2. One of the key objectives of mention in clause 6.13.2 is that: The 5G system should be able to apply QoS to a multicast/broadcast service area. To satisfy the requirement of switching the delivery mode to guarantee QoS requirements, it is necessary to introduce mapping of each MBS QoS flow within or multicast session data to a particular DRB/MRB bearer to allow network to select an optimal delivery mode for each MBS Flow. Therefore, it is necessary to introduce an IE such as MRB-SDAPConfig (Table 2), within which an MBS flow (i.e., the follow identified by its ID or MBS Context ID or MBS service or area or group ID) and its associated QoS information (such as QFIs index, GBR, ARP etc.) are mapped to specific DRB/MRB bearer related to the MBS session data identified by MBS-Session dataId IE. It may also be necessary to include within MRB-SDAPConfig IE an IE such as mappedQoS-FlowsToAdd IE to indicates the list of QFIs of MBS QoS flows of the MBS session data to be mapped to the default MRB and the mappedQoS-FlowsToRelease to indicates the list of QFIs of QoS flows of the MBS session data to be released from existing QoS flow of the default MRB.

additional modifications in NR MBS. The modification may include providing additional information within the counting response list IE (CountingResponseList-nr) such as UE suggested delivery mode, downlink consumption report, required QoS, and/or UE subscription information for given TMGI indicated within the received counting request. The information may also include MBS related measurement (e.g., RSRQ, RSRP, and/or SNR) for the frequency providing the TMGI indication as illustrated in the following table of MBSCountingResponse-NR (Table 3). Alternatively, some embodiments propose that the UE could also use MBS interest indication RRC message with the same modification mentioned above as an indication message to the network (i.e., an NG-RAN node) for switching MBS delivery mode. In this case, the same additional information such as the UE suggested delivery mode, downlink consumption report, required QoS, and/or UE subscription information for given TMGI indicated within the received counting request or the MBS related measurement (e.g., RSRQ, RSRP, and/or SNR) for the frequency providing the TMGI indication could be included within MBSInterestIndication-NRMBS message as illustrated in Table 4. For the indication message communicated by the network (i.e., an NG-RAN node) to UE to indicate the time or the scheduling interval within which the

TABLE 2

| MRB-SDAPConfig | |
|---|---|
| MRB-SDAPConfig ::=<br>    mbs-Session dataID<br>    sdap-HeaderDL<br>    defaultMRB<br>    mappedQoS-FlowsToAdd<br>OPTIONAL, -- Need N<br>    mappedQoS-FlowsToRelease SEQUENCE(SIZE (1..maxNrofMQFIs)) OF MBS-QFI<br>OPTIONAL, -- Need N<br>    ...<br>}<br>MBS-QFI ::=<br>    mbsQFI<br>        mbsQFinfo<br>            mbsFlowId<br>OR<br>            mbsContextId<br>OR<br>            mbsServiceId<br>OR<br>        }<br>}<br>maxNrofMQFIs<br>maxMBSQFI<br>MBS-Session dataID ::= | SEQUENCE {<br>MBS-Session dataId<br>ENUMERATED {present, absent}<br>BOOLEAN,<br>SEQUENCE(SIZE (1..maxNrofMQFIs)) OF MBS-QFI<br><br><br><br><br><br>SEQUENCE {<br>INTEGER (0..maxMBSQFI),<br>CHOICE {<br>OCTET STRING (SIZE (1))    OPTIONAL -- Need<br><br>OCTET STRING (SIZE (3))    OPTIONAL -- Need<br><br>OCTET STRING (SIZE (3))    OPTIONAL -- Need<br><br><br><br>INTEGER ::= e.g., 16<br>INTEGER ::= e.g., 15<br>INTEGER (0..28) |

Further RRC enhancements: For the RRC-based indication message communicated by UE to network for switching MBS delivery mode, some embodiments propose to reuse the existing LTE MBS counting request/response with some switching of radio bearer is going to occur, some embodiments propose either to piggyback the indication with MBS data within the MBS downlink channel or to use a separate RCC message such as MBS counting request.

TABLE 3

MBMSCountingResponse-NR

```
MBMSCountingResponse-NR ::=        SEQUENCE {
    criticalExtensions             CHOICE {
        c1                         CHOICE {
            countingResponse-nr            MBMSCountingResponse-nr-IEs,
            spare3 NULL, spare2 NULL, spare1 NULL
        },
        criticalExtensionsFuture       SEQUENCE { }
    }
}
MBMSCountingResponse-nr-IEs ::=    SEQUENCE {
    mbsfn-AreaIndex-nr             INTEGER (0..maxMBSFN-Area-1 ) OPTIONAL,
    countingResponseList-nr        CountingResponseList-r10    OPTIONAL,
    lateNonCriticalExtension       OCTET STRING                OPTIONAL,
    nonCriticalExtension           SEQUENCE { }                OPTIONAL
}
CountingResponseList-nr ::=        SEQUENCE (SIZE (1..maxServiceCount)) OF
CountingResponseInfo-nr
CountingResponseInfo-nr ::=        SEQUENCE {
    countingResponseService-nr     INTEGER (0..maxServiceCount-1),
    tmgi-DeliveryMode              ENUMERATED { MRB/PTMBearer, DRB/PTPBearer }
    tmgi-DLconsumption             OCTET STRING
    tmgi-QoSRequirement            ENUMERATED {delay, loss-rate, data-rate}
    mbmsMeasure                    CHOICE {
        rsrqResult-nr              RSRq-Range,                 Optional,
        rsrpResult-nr              RSRP-Range,                 Optional,
        sinrResult-nr              SINR-Range                  Optional,
        ...
}
}
```

TABLE 4

MBSInterestIndication-NRMBMS

```
MBMSInterestIndication-NR ::=      SEQUENCE {
    criticalExtensions             CHOICE {
        c1                         CHOICE {
            interestIndication-nr          MBMSInterestIndication-nr-IEs,
            spare3 NULL, spare2 NULL, spare1 NULL
        },
        criticalExtensionsFuture       SEQUENCE { }
    }
}
MBMSInterestIndication-nr-IEs ::= SEQUENCE {
    mbms-FreqList-nr               CarrierFreqListMBMS-nr              OPTIONAL,
    mbms-Priority-nr               ENUMERATED {MBMS, unicast, mixed }
OPTIONAL,
    mbms-DeliveryMode              ENUMERATED {MRB/PTMBearer, DRB/PTPBearer}
    mbms-DLconsumption             OCTET STRING
    mbms-QoSRequirement            ENUMERATED {delay, loss-rate, data-rate}
    mbmsMeasurement                CHOICE {
        rsrqResult-nr              RSRq-Range,                 Optional,
        rsrpResult-nr              RSRP-Range,                 Optional,
        sinrResult-nr              SINR-Range                  Optional,
        ... },
    lateNonCriticalExtension       OCTET STRING                        OPTIONAL,
    nonCriticalExtension           MBMSInterestIndication-v1310-IEs    OPTIONAL
}
```

Proposal: MBSMBSMBS

PDCP and RLC Enhancements:

PDCP Enhancements To achieve, a reliable delivery of MBS service over the configured DRB/MRB delivery modes, some embodiments propose to enable the support of PDCP data recovery, PDCP re-establishment, loss-less switching between DRB and MRB modes and PDCP ciphering with MRB/DRB bearer configured for an MBS multicast session data if required by upper layer.

RLC Enhancements: To achieve, a reliable delivery of MBS service over the configured DRB/MRB delivery modes, some embodiments propose to allow MRB/DRB bearer configured for multicast session data to use RLC-AM or RLC-UM modes, and allow logical multicast traffic and control channels configured for MRB/DRB bearers carrying multicast session data to use RLC-UM or RLC-AM mode.

MAC/PHY Enhancements:

To guarantee an efficient delivery of MBS service mapped over MRB/DRB while maximizing network resource efficiency, it is highly desirable in NR MBS to configure dynamically the resources for an MBS session data carried over MRB or DRB bearers. Therefore, some embodiments propose to allocate dynamically for multicast MRB/DRB bearers the frequency domain (e.g. modulation and coding scheme (MCS), and radio resource blocks RBs) and the time domain resource (e.g., sub-frame, or slot or sub-slot, symbol and transport blocks (TBs)) of the transport (MCH/DL-SCH) and physical downlink multicast channel (PMCH/PDSCH).

Some embodiments propose the network (i.e., an NG-RAN node) communicates to UE via a MAC control element within transport channel or an indication within logical channel or physical MBS downlink channel an explicit indication about the time or the scheduling interval within which the radio bearer of a given MBS/multicast session data is going to be switched and other additional assistance information such as the frequency and/or identity of the neighboring cells or areas which broadcasting the same service which UE is receiving.

Some embodiments propose UE to send the indication message to the network (i.e., an NG-RAN node) to indicate UE suggested delivery mode, downlink consumption report, required QoS, and/or UE subscription information via either a MAC control element within transport channel or an indication within logical channel or within the physical channel.

In summary, in some embodiments, a dynamic change of multicast/broadcast service delivery between multicast (PTM) and unicast (PTP) from RAN WG2 and SA WG2 perspective is provided. In the framework of multicast-broadcast delivery mode switching, the conventional design relies only on counting the number of users within the whole multicast/broadcast service (MBS) area interested in same content to decide and trigger the mode-switching. The counting based mode-switching applies MBS service suspension/resumption mechanism to achieve the delivery mode switching. Such a mechanism involves on updating and modifying of the MBS session data from the core network, which may increase the service interrupt time for a UE. Therefore, NR MBS is targeting per UE dynamic switching to capture UE activities, mobility, QoS requirements, and/or other NG-RAN or core network requirements. Therefore, an advance mode-switching mechanism is highly required for NR MBS. In some embodiments of the present disclosure, in this contribution, a proposal for dynamic, reliable, and efficient MBS delivery mode switching based on the switching radio bearers for multicast/broadcast MBS session data is discussed. In some embodiments, the proposal assumes that; a UE may send an indication message to the network to trigger the delivery mode switching. The UE indication message may include: UE Capability information e.g. whether the UE supports multicast/broadcast delivery mode, MBS downlink consumption report, MBS QoS related information, MBS delivery mode information, an explicit UE request for a delivery mode switching, MBS channel or signal related measurement (e.g., RSRQ, RSRP and/or SNR), and/or MBS subscription service changes etc. Such as indication message could be sent by UE via uplink control information UCI and/or MAC control element MAC CE (e.g., an indication within logical or transport channel) and/or RRC message (e.g., MBS interest indication or MBS counting request/response) to the network.

In some embodiments, based on the indication message received from UE and/or the RAN internal configuration and/or the core network (CN) indications, the network decides whether or not to switch the radio bearers of an MBS session data received by a given UE. The RAN internal configuration may include: NG-RAN capabilities (e.g., whether the RAN supports multicast/broadcast delivery mode), NG-RAN performance (e.g. congestion status or load or failure, communication performance) and/or radio resources availability etc. The core network indications may include: MBS service statistics or prediction reports, UEs subscription information, MBS QoS related information indication (e.g. TMGI, MBS Context ID, service ID, flow IDs, SAI, GBR, ARP, area IDs, CN congestion reports, and indication about a failure of either unicast or MBS CN node, CN upper application suggested delivery indication etc. Such indications can be provided from CN to NG-RAN via NG-U tunnel or N2 interface. In case that network decides there is a need to switch delivery mode of MBS data received via MBS/multicast data session data (MDU) to be received via PDU session data or vice versa. The network can notify UE during current MBS scheduling interval e.g. via multicast control information channel that the radio bearer of current MBS/multicast session data is going to be switched in upcoming MBS scheduling period/interval while keep sending the MBS/multicast session data over the existing radio bearers. The notification may include in addition to the information regarding the scheduling interval of the new radio bearer other assistance information such as the frequency or cell that broadcast the same service that UE is receiving. The network can also release an existing radio bearer (e.g., MRB) and configure a new radio bearer (e.g., MRB) as well as the appropriate logical, transport and physical channels for the new radio bearer. In the upcoming MBS scheduling interval, the network switches MBS session data to the new radio bearer.

In some embodiments of the present disclosure, advantages of the radio bearer based switching method discussed above is ensuring that UE will keep receiving MBS session data even at the switching time, which provides a seamless transition of the delivery modes. In addition, the method does not require updating the session data from core network, which minimizes the service interruption time. Moreover, the method informs UE about the time when the new radio bearers is going to be scheduled and provide other assistance information that could help UE to adjust its reception configuration beforehand to optimally receive the new configured radio bearer. It is understood that that the network will keep sending the multicast or MBS session data the over the existing radio bearers in the case that the network decides there is no need for a delivery mode switching.

Advantages of some embodiments of the present disclosure are to provide a method that addresses issues of how switching of multicast/broadcast delivery mode is performed RAN level node while supporting service continuity and complying with the approved 5G MBS mode-switching proposals provided in SA WG2. Others advantages of some embodiments of the present disclosure at UE side and network side include as follows.

UE side effect: 1. The new method provides a dynamic and seamless switching mechanism based on switching only the radio bearers for MBS/multicast session data without the need of updating the MBS session data or leaving or restarting a IP multicast session data. This could help in reducing UE service interruption time and enhanced the UE experience. 2. The method provides an explicit indication to UE about time or scheduling period/interval within which switched radio bearers are going to be scheduled prior to a switching process. This could help UE on adjusting its reception configuration/behavior beforehand to receive a new configured radio bearer optimally.

Network side effect: 1. Form network side perspective, on the top of maximizing radio resource efficiency, the method allows the switching to meet other network requirement such as meeting NG-RAN capability requirement or guaranteeing a specific communication performance or recovering from congestion and failure.

Commercial interests for some embodiments are as follows. 1. Solving issues in the prior art. 2. Provide a dynamic, reliable, and/or efficient MBS delivery mode switching. 3. Supporting service continuity. 4. Providing a good communication performance. 5. Providing a high reliability. 6. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure propose technical mechanisms.

Figure 9:
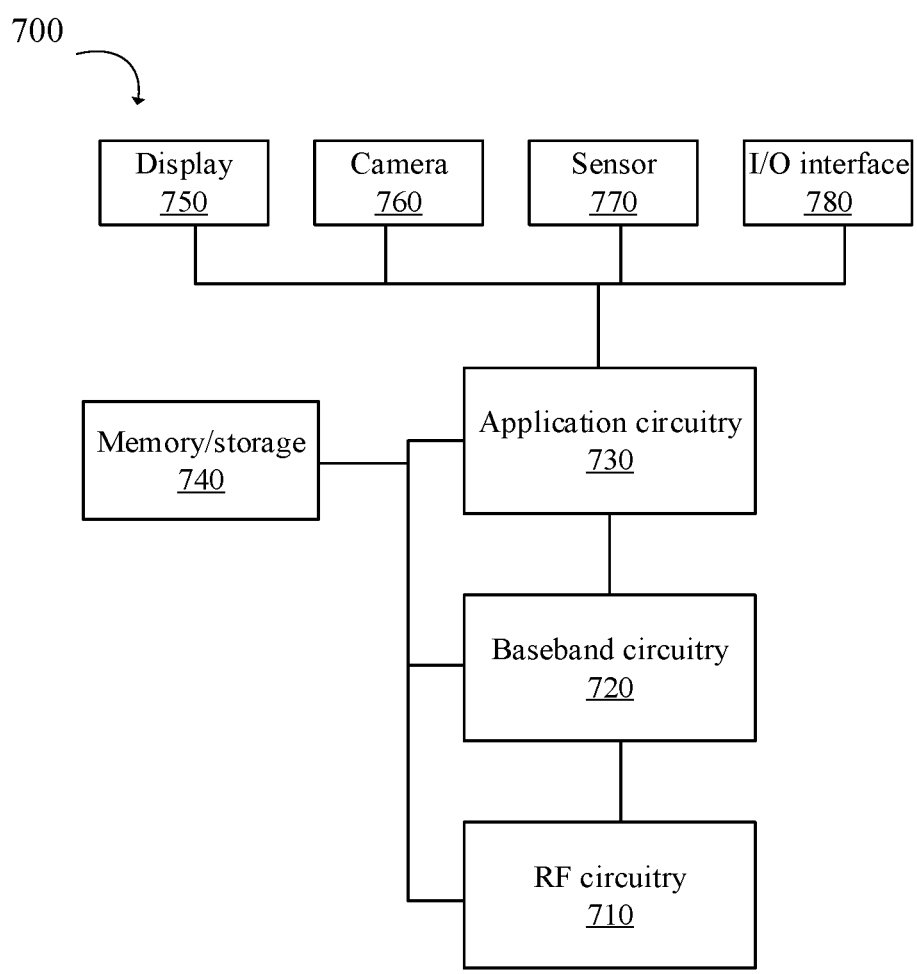
FIG. 9 is a block diagram of a system for wireless communication according to an embodiment of the present disclosure.

FIG. 9 is a block diagram of an example system 700 for wireless communication according to an embodiment of the present disclosure. Embodiments described herein may be implemented into the system using any suitably configured hardware and/or software. FIG. 9 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method for switching a multicast-broadcast delivery mode performed by a base station, comprising:
switching based on evaluating a radio access network (RAN) internal configuration or a core network indication, radio bearers for a multicast/broadcast service (MBS) session data between a multicast/broadcast radio bearer (MRB) and a unicast data radio bearer (DRB);
wherein the RAN internal configuration comprises a network capability regarding whether a network supports a multicast/broadcast delivery mode, the core network indication comprises MBS Quality-of-Service (QOS) related information, and the specific network requirement is a next generation-RAN MBS (NG-RAN MBS) support capability requirement.

2. The method of claim 1, wherein switching the multicast-broadcast delivery mode comprises an enhancement of a service data adaptation protocol (SDAP) layer, a radio resource control (RRC) layer, and/or a packet data convergence protocol (PDCP) layer.

3. The method of claim 2, wherein the enhancement of the SDAP layer comprises introducing a mapping of MBS Quality-of-Service (QOS) flows of an MBS session to specific DRB bearers.

4. The method of claim 2 wherein the enhancement of the PDCP layer comprises enabling a support of a PDCP data recovery, a PDCP re-establishment, and/or an MRB/DRB bearer configured for an MBS multicast session.

5. A base station, comprising:
a memory;
a transceiver; and
a processor coupled to the memory and the transceiver;
wherein the processor is configured to perform switching a multicast-broadcast delivery mode, wherein switching the multicast-broadcast delivery mode comprises switching based on evaluating a radio access network (RAN) internal configuration or a core network indication, radio bearers for a multicast/broadcast service (MBS) session data between a multicast/broadcast radio bearer (MRB) and a unicast data radio bearer (DRB) to guarantee a specific network requirement;
wherein the RAN internal configuration comprises a network capability regarding whether a network supports a multicast/broadcast delivery mode, the core network indication comprises MBS Quality-of-Service (QOS) related information, and the specific network requirement is a next generation-RAN MBS (NG-RAN MBS) support capability requirement.

6. The base station of claim 5, wherein switching the multicast-broadcast delivery mode comprises an enhancement of a service data adaptation protocol (SDAP) layer, a radio resource control (RRC) layer, and/or a packet data convergence protocol (PDCP) layer.

7. The base station of claim 6, wherein the enhancement of the SDAP layer comprises introducing a mapping of MBS Quality-of-Service (QOS) flows of an MBS session to specific DRB bearers.

8. The base station of claim 6 wherein the enhancement of the PDCP layer comprises enabling a support of a PDCP data recovery, a PDCP re-establishment, and/or an MRB/DRB bearer configured for an MBS multicast session.

9. A wireless communication method performed by a base station, comprising:
switching a multicast-broadcast delivery mode, wherein switching the multicast-broadcast delivery mode comprises switching based on evaluating a radio access network (RAN) internal configuration or a core network indication, radio bearers for a multicast/broadcast service (MBS) session data between a multicast/broadcast radio bearer (MRB) and a unicast data radio bearer (DRB);
wherein the RAN internal configuration comprises a network capability regarding whether a network supports a multicast/broadcast delivery mode, the core network indication comprises MBS Quality-of-Service (QOS) related information, and the specific network requirement is a next generation-RAN MBS (NG-RAN MBS) support capability requirement.

10. The method of claim 9, wherein switching the radio bearers for the MBS session data between the MRB and the DRB is used to guarantee a specific network requirement.

11. The method of claim 9, wherein switching the multicast-broadcast delivery mode comprises an enhancement of a service data adaptation protocol (SDAP) layer, a radio resource control (RRC) layer, and/or a packet data convergence protocol (PDCP) layer.

12. The method of claim 11, wherein the enhancement of the SDAP layer comprises introducing a mapping of MBS Quality-of-Service (QOS) flows of an MBS session to specific DRB/MRB bearers.

13. The method of claim 11 wherein the enhancement of the PDCP layer comprises enabling a support of a PDCP data recovery, a PDCP re-establishment, and/or an MRB/DRB bearer configured for an MBS multicast session.

14. The method of claim 11, wherein the enhancement of the RLC layer comprises allowing an MRB bearer configured for a multicast session to use an RLC unacknowledged mode (UM) and allowing logical multicast traffic and control channels configured for the multicast session to use the RLC UM.

* * * * *